US011472598B1

(12) United States Patent
Mayol Cuevas

(10) Patent No.: US 11,472,598 B1
(45) Date of Patent: Oct. 18, 2022

(54) SYSTEMS AND METHODS TO ENCODE SOUNDS IN ASSOCIATION WITH CONTAINERS

(71) Applicant: Amazon Technologies, Inc., Seattle, WA (US)

(72) Inventor: Walterio Wolfgang Mayol Cuevas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 15/815,495

(22) Filed: Nov. 16, 2017

(51) Int. Cl.
| | |
|---|---|
| B65D 5/74 | (2006.01) |
| G06F 3/0488 | (2022.01) |
| H04L 12/18 | (2006.01) |
| G10L 19/008 | (2013.01) |
| H04L 51/046 | (2022.01) |
| H04R 5/04 | (2006.01) |

(52) U.S. Cl.
CPC .......... *B65D 5/744* (2013.01); *G06F 3/0488* (2013.01); *G10L 19/008* (2013.01); *H04L 12/1827* (2013.01); *H04L 51/046* (2013.01); *H04R 5/04* (2013.01)

(58) Field of Classification Search
CPC ............................ B65D 5/744; B65D 75/5888; B65D 75/5894; B65D 75/66; B65D 75/68; B65D 5/54; B65D 3/263; B65D 3/265; B65D 3/1267; G06F 3/0488; G10L 19/008; H04L 12/1827; H04L 51/046; H04R 5/04
See application file for complete search history.

(56) References Cited

U.S. PATENT DOCUMENTS

| | | | | |
|---|---|---|---|---|
| 4,232,787 A | * | 11/1980 | Holiday ................. | B65D 75/66 206/820 |
| 5,464,092 A | * | 11/1995 | Seeley ................. | B65D 5/4291 206/217 |
| 8,121,264 B1 | | 2/2012 | Hogg, Jr. et al. | |
| 9,674,290 B1 | | 6/2017 | Rincon et al. | |
| 9,824,490 B1 | | 11/2017 | Côté et al. | |
| 2003/0089734 A1 | * | 5/2003 | Eberhardt ................. | B65D 1/00 222/39 |
| 2003/0229900 A1 | | 12/2003 | Reisman | |
| 2004/0074799 A1 | * | 4/2004 | Bell ....................... | B65D 75/66 206/459.1 |

(Continued)

OTHER PUBLICATIONS

Google Glass—Wikipedia, https://en.wikipedia.org/wiki/Google_Glass, downloaded from internet on Aug. 7, 2017, pp. 1-14.

(Continued)

*Primary Examiner* — Jason R Kurr
(74) *Attorney, Agent, or Firm* — Athorus, PLLC

(57) ABSTRACT

Systems and methods to encode sounds in association with containers, as well as systems and methods to recognize encoded sounds associated with containers, are described. The containers may include various structures to encode sounds. Responsive to opening of containers, the various structures may emit the encoded sounds. An audio capture device may receive the encoded sounds, and a computing device may process the encoded sounds to identify audio signatures within the encoded sounds. The audio signatures may be matched with known audio signatures to identify the containers and/or information associated with the containers.

17 Claims, 9 Drawing Sheets

(56) References Cited

U.S. PATENT DOCUMENTS

| | | | |
|---|---|---|---|
| 2004/0086604 A1* | 5/2004 | Grandey | B65D 81/365 426/106 |
| 2004/0189675 A1 | 9/2004 | Pretlove et al. | |
| 2008/0087562 A1* | 4/2008 | Berger | B65D 5/722 206/268 |
| 2008/0101456 A1 | 5/2008 | Ridge et al. | |
| 2010/0221469 A1* | 9/2010 | Mills | B65D 75/5844 428/35.5 |
| 2011/0162984 A1* | 7/2011 | Bellamah | B65D 21/0227 206/236 |
| 2012/0027322 A1* | 2/2012 | Ackerman | A44B 19/24 383/64 |
| 2012/0085767 A1* | 4/2012 | Read | B65D 5/48038 220/523 |
| 2013/0068649 A1* | 3/2013 | Chen | G01N 33/493 206/459.1 |
| 2013/0083003 A1 | 4/2013 | Perez et al. | |
| 2014/0100996 A1 | 4/2014 | Klein et al. | |
| 2014/0103100 A1* | 4/2014 | Falcon | B65D 5/4204 229/103.2 |
| 2014/0263426 A1 | 9/2014 | Gasper | |
| 2014/0285668 A1 | 9/2014 | Deweese et al. | |
| 2015/0021218 A1* | 1/2015 | McKenzie | B65D 75/5844 206/264 |
| 2015/0127486 A1 | 5/2015 | Advani | |
| 2015/0196138 A1* | 7/2015 | Juric | A47F 5/0025 211/59.3 |
| 2015/0346722 A1 | 12/2015 | Herz et al. | |
| 2016/0103437 A1 | 4/2016 | Alfredsson et al. | |
| 2016/0277802 A1 | 9/2016 | Bernstein et al. | |
| 2016/0283967 A1 | 9/2016 | Mitchell | |
| 2016/0349509 A1 | 12/2016 | Lanier et al. | |
| 2017/0041557 A1 | 2/2017 | Urich et al. | |
| 2017/0061693 A1 | 3/2017 | Kohler et al. | |
| 2017/0064154 A1 | 3/2017 | Tseng et al. | |
| 2017/0124713 A1 | 5/2017 | Jurgenson et al. | |
| 2017/0155725 A1 | 6/2017 | Rincon et al. | |
| 2018/0186552 A1* | 7/2018 | DeMatteis | B65B 5/06 |
| 2019/0125629 A1* | 5/2019 | Foubet | A61J 7/0069 |

OTHER PUBLICATIONS

Google Goggles—Wikipedia, https://en.wikipedia.org/wiki/Google_Goggles, downloaded from internet on Aug. 7, 2017, pp. 1-3.

Guven and Feiner, "Interaction Techniques for Exploring Historic Sites Through Situated Media," Proc. 3DUI '06 (Symposium on 3D User Interfaces), Alexandria, VA, Mar. 25-26, 2006, pp. 1-10.

Karsch, K., Golparvar-Fard, M., Forsyth, D. 2014. ConstructAide: Analyzing and Visualizing Construction Sites through Photographs and Building Models. ACM Trans. Graph. 33, 6, Article 176 (Nov. 2014), 11 pages.

Kinect—Wikipedia, https://en.wikipedia.org/wiki/Kinect, downloaded from internet on Aug. 7, 2017, pp. 1-15.

Microsoft HoloLens—Wikipedia, https://en.wikipedia.org/wiki/Microsoft_HoloLens, downloaded from internet on Aug. 7, 2017, pp. 1-8.

Samsung Gear VR—Wikipedia, https://en.wikipedia.org/wiki/Samsung_Gear_VR, downloaded from internet on Aug. 7, 2017, pp. 1-5.

URL: https://www.youvisit.com/ (Web Archive version dated Sep. 27, 2016, URL: https://web.archive.org/web/20160927064242/https://www.youvisit.com:80/), 7 pages.

Vlahakis et al., "Archeoguide: An Augmented Reality Guide for Archaeological Sites", IEEE Computer Graphics and Applications, Sep./Oct. 2002, pp. 52-60.

Mayol-Cuevas W.W. et al., "A First Approach to Tactile Texture Recognition", LINDA Group/Div. Ing. Electrica/Fac. Ingenieria, Universidad Nacional Autonoma de Mexico, IEEE, 1998, 5 pages.

Editor, "uZoom Launches LiveShopCast to Power Live Video Sales", Home Business Magazine, Aug. 30, 2017, https://homebusinessmag.com/businesses/ecommerce/uzoom-launches-liveshopcast-power-live-video-sales/, pp. 1-4.

* cited by examiner

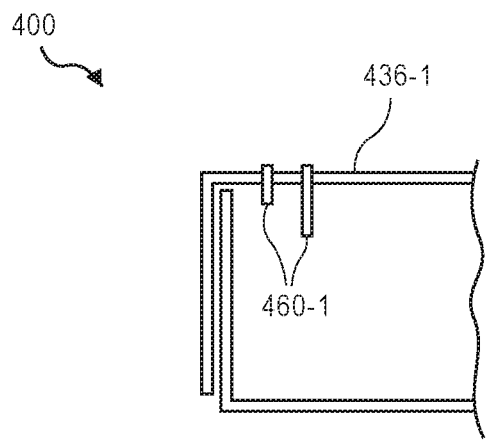
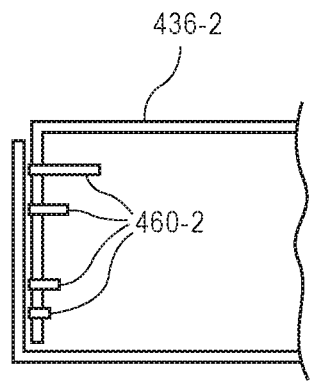
FIG. 4A  FIG. 4B
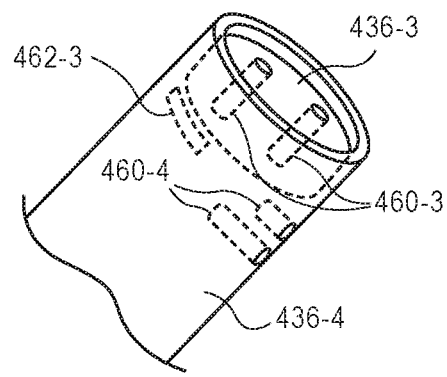
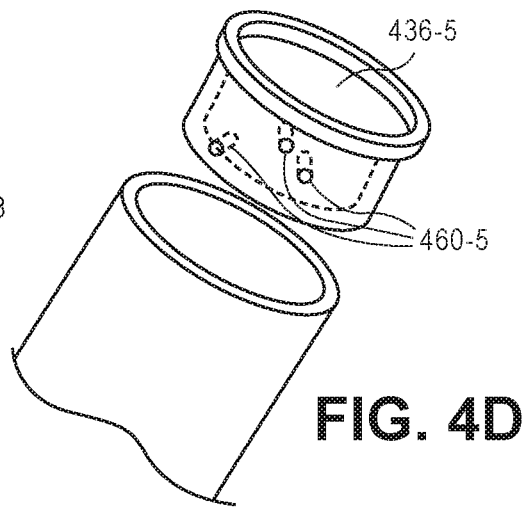
FIG. 4C  FIG. 4D
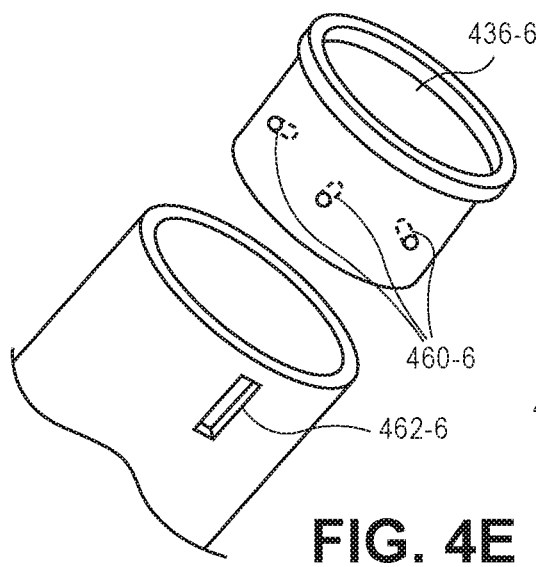
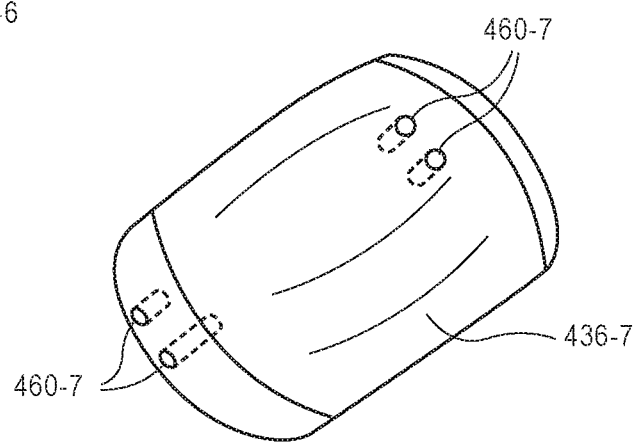
FIG. 4E  FIG. 4F

SYSTEMS AND METHODS TO ENCODE SOUNDS IN ASSOCIATION WITH CONTAINERS

BACKGROUND

Generally, objects or items may be identified using various visual markers, such as barcodes or other identifiers, or using electromagnetic waves, such as radiofrequency identification tags, and actions related to the objects or items may subsequently be identified, such as sortation or storage of objects within a material handling facility or charging purchase prices of objects in a retail setting. However, such identification systems and methods may require dedicated or expensive hardware, as well as complex methods to perform identification. For example, visual identification systems may require high resolution cameras or dedicated barcode scanners and corresponding computer vision or image recognition algorithms, and electromagnetic identification systems may require dedicated radiofrequency identification readers and corresponding identification algorithms. Accordingly, there is a need for systems and methods to identify objects or items without requiring dedicated or expensive hardware and devices, or complicated computer vision or image recognition algorithms.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 4A-4F are schematic diagrams of still further example embodiments of containers having associated encoded sounds, according to an implementation.

Figure 1:
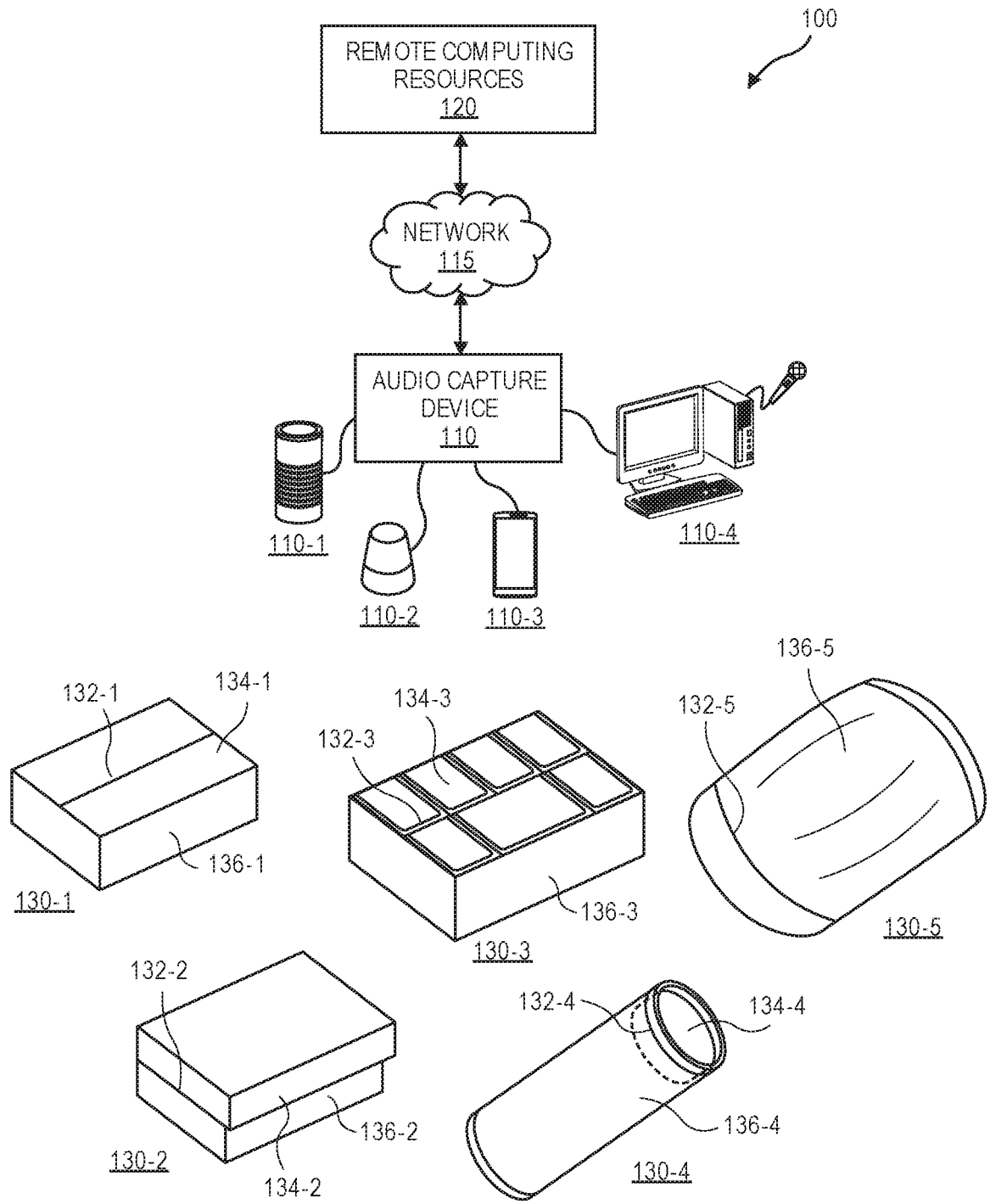
FIG. 1 is a schematic diagram of example embodiments of a system to recognize encoded sounds associated with containers, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Systems and methods to encode sounds in association with containers are described herein. In addition, systems and methods to recognize encoded sounds associated with containers are also described herein. Further, systems and methods to initiate actions based on encoded sounds associated with containers are also described herein.

Containers or compartments within containers may be associated with encoded sounds. Each container or each compartment may be associated with a unique encoded sound. For example, the containers may include rectangular containers or boxes, such as shipping boxes, cardboard boxes, shoeboxes, or other types of boxes. In addition, the containers may include cylindrical containers, such as shipping or mailing tubes. Further, the containers may include bags, pouches, or other types of flexible containers. Moreover, any of the containers may be divided into a plurality of compartments that may be individually closed or sealed and individually associated with a unique encoded sound. Furthermore, individual containers or individual compartments of containers may include one or more objects, items, or products. The one or more objects, items, or products may include any physical items, identifiers or indicators associated with services, identifiers or indicators associated with digital items, local items, item samples, consumable items, perishable items, novelty items, images, documents, pamphlets, smells, liquids, other types of matter, or any other objects, items, or products that may be purchased, leased, rented, borrowed, or otherwise obtained by or provided to a user.

The containers may include various structures to facilitate opening of the containers. For example, the containers may include seams, covers, doors, endcaps, flaps, surfaces, edges, or other structures that may be opened in order to allow access to contents of the containers.

One or more sounds may be encoded and associated with the containers such that the sounds are emitted upon opening of the containers. For example, a cord, string, or zipper may be embedded, formed in, or attached to seams, covers, doors, endcaps, flaps, surfaces, edges, or other structures of containers. In addition, the cord, string, or zipper may extend along one or more perforations or air pockets. Further, the perforations or air pockets may have particular shapes and/or spacing to encode a particular sound or sequence of sounds. Accordingly, when the cord, string, or zipper is pulled or moved to open the container, the sound or sequence of sounds encoded by the perforations or air pockets may be emitted and received by an audio capture device.

In some example embodiments, a tape may be adhered to seams, covers, doors, endcaps, flaps, surfaces, edges, or other structures of containers. In addition, the tape may include a plurality of adhesive sections and a plurality of non-adhesive sections. Further, the adhesive and non-adhesive sections may have particular shapes and/or spacing to encode a particular sound or sequence of sounds. Accordingly, when the tape is pulled or removed to open the container, the sound or sequence of sounds encoded by the adhesive and non-adhesive sections may be emitted and received by an audio capture device.

In other example embodiments, one or more materials may be present at an interface between two components of a container that move relative to each other upon opening of the container, e.g., at seams, covers, doors, endcaps, flaps, surfaces, edges, or other structures of containers. The materials may encode a particular sound based on characteristics of the materials. In addition, the materials may have particular shapes and/or spacing to encode a particular sound or sequence of sounds. Accordingly, when one component is moved relative to another component of the container to open the container, the sound or sequence of sounds encoded by the one or more materials may be emitted and received by an audio capture device.

In still further example embodiments, one or more pipes, tubes, or whistles may be included within seams, covers, doors, endcaps, flaps, surfaces, edges, or other structures of containers. In addition, the pipes, tubes, or whistles may encode a particular sound based on characteristics of the pipes, tubes, or whistles. In addition, the pipes, tubes, or whistles may be included at particular locations to encode a particular sound or sequence of sounds. Accordingly, when air is forced through the pipes, tubes, or whistles to open the container, the sound or sequence of sounds encoded by the one or more pipes, tubes, or whistles may be emitted and received by an audio capture device.

The encoded sounds received by an audio capture device may be processed in order to recognize the encoded sounds. For example, the processing may include dynamic time warping, compressing or expanding portions of the encoded sounds, removing portions of the encoded sounds, amplifying portions of the encoded sounds, filtering portions of the encoded sounds, identifying a reference sound associated with the encoded sounds, and/or reference time shifting portions of the encoded sounds, e.g., based on the identified reference sound, or reference audio signature.

Following processing of the encoded sounds, a unique sound, or unique audio signature, may be identified within the encoded sounds. Then, the identified unique audio signature may be compared with a plurality of known unique audio signatures, and correlated with a particular known unique audio signature having a highest similarity. Based on the correlation, the container and/or information associated with the container may be identified.

Responsive to identifying the container and/or information associated with the container based on the received encoded sounds, one or more actions or outputs may be triggered or initiated. For example, the actions or outputs may be provided via an audio output device, a visual output device, a mobile computing device, or any other computing device. In addition, the actions or outputs may include audio and/or video messages, information or instructions related to the container or an item contained therein, performance of a task related to purchase or acquisition of an item contained therein, interaction with another application operating on a mobile computing device or other computing device, performance of a task associated with inventory or supply chain management, or various other actions or outputs.

FIG. 1 is a schematic diagram of example embodiments of a system 100 to recognize encoded sounds associated with containers, according to an implementation.

As shown in FIG. 1, an audio capture device 110 may be in communication with remote computing resources 120 via a network 115. The audio capture device 110 may include one or more audio capture devices such as connected home devices, voice-controlled devices, mobile computing devices, televisions or other display devices having an associated microphone or other audio input device, or other computing devices having a microphone or other audio input device. FIG. 1 includes various non-limiting examples of audio captures devices 110-1, 110-2, 110-3, 110-4.

The network 115 may be any communication network via which the audio capture device 110 may communicate with remote computing resources 120. For example, the network 115 may include wireless or wired networks, and may include WiFi networks, LAN (local area networks), WAN (wide area networks), cellular communication networks, satellite communication networks, the Internet, or other networks.

Figure 8:
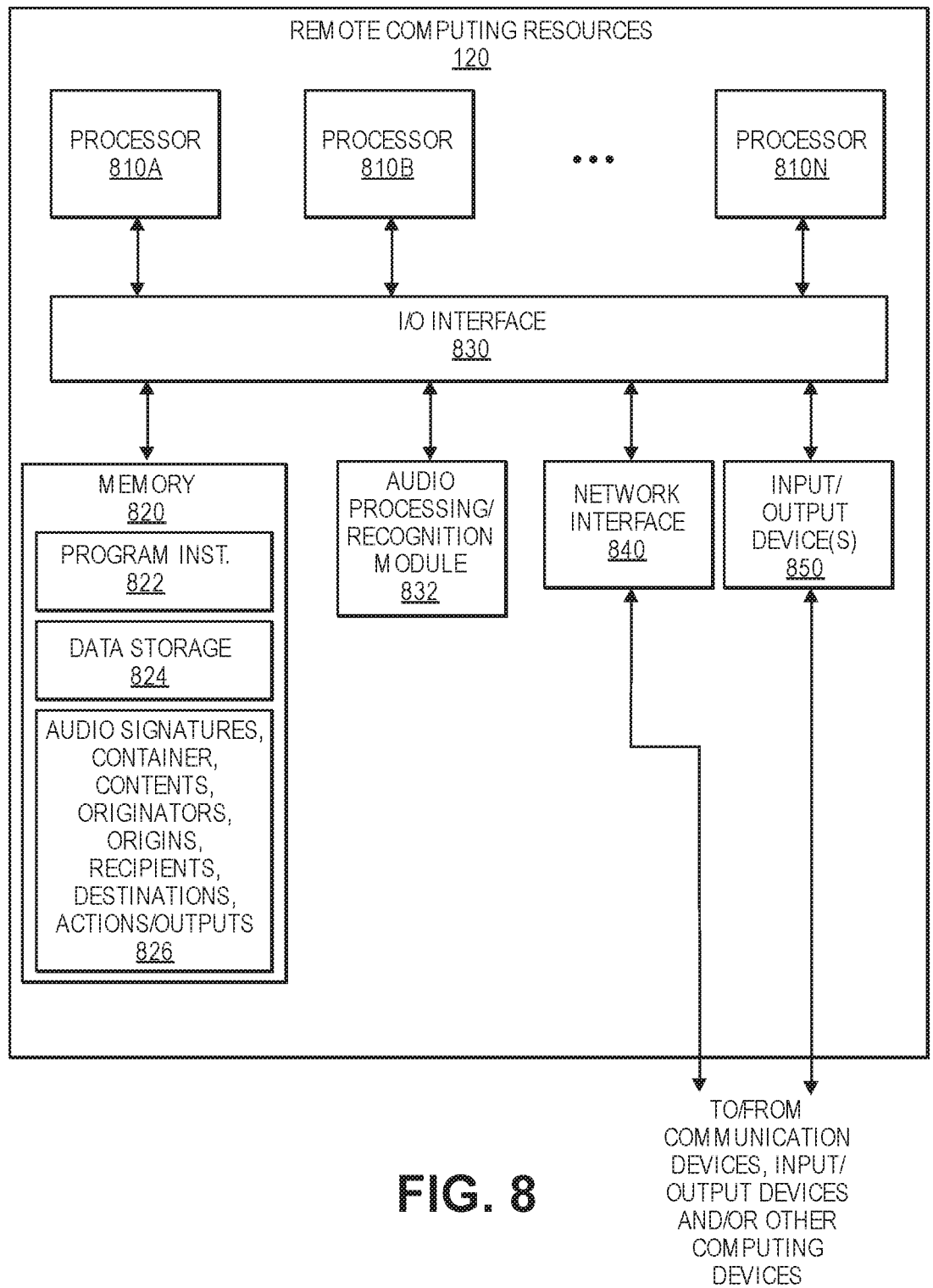
FIG. 8 is a block diagram illustrating various components of remote computing resources, according to an implementation.

The remote computing resources 120, as described herein at least with respect to FIG. 8, may be any computing resources that may receive, process, and recognize encoded sounds captured by the audio capture device 110. In addition, the remote computing resources 120 may establish or utilize communication connections with the audio capture device 110 and/or various output devices, such as audio output devices, visual output devices, mobile computing devices, or other computing devices. Further, the remote computing resources 120 may initiate or trigger one or more actions or outputs with respect to any of the connected output devices, as described herein at least with respect to FIG. 6.

Although FIG. 1 shows an audio capture device 110 that is connected to remote computing resources 120 via a network 115, in other embodiments, the audio capture device 110 may be connected to local computing resources, having the same or similar structure and functionality as remote computing resources 120, and the receiving, processing, and recognizing of encoded sounds, as well as the initiating of actions or outputs based on the encoded sounds, may be performed using computing resources local to the audio capture device 110. In further embodiments, both local and remote computing resources may be connected to the audio capture device and may perform one or more portions of the receiving, processing, recognizing, and/or initiating individually or in combination.

FIG. 1 also illustrates various example containers 130 having associated encoded sounds that may be captured and recognized by the audio capture device 110 and remote computing resources 120. For example, container 130-1 is an example rectangular container, e.g., a cardboard box, that includes a seam 132-1 on its top surface, one or more openable doors or flaps 134-1, and one or more other surfaces or edges 136-1. Container 130-2 is another example rectangular container, e.g., a shoebox, that includes a seam 132-2 between a cover and a base, an openable cover 134-2, and one or more other surfaces or edges 136-2. Container 130-3 is yet another example rectangular container, e.g., a box having a plurality of compartments, that includes a seam 132-3 associated with a compartment, an openable cover, door, or flap 134-3 of the compartment, and one or more other surfaces or edges 136-3. In some embodiments, each of the compartments of the container 130-3 may include a respective seam 132-3 and/or a respective openable cover 134-3. Container 130-4 is an example cylindrical container, e.g., a shipping tube, that includes a seam 132-4 near an end of the container, an openable endcap 134-4, and one or more other surfaces or edges 136-4. Container 130-5 is an example bag or pouch, e.g., a flexible container, that includes a seam 132-5 to open the container, and one or more other surfaces or edges 136-5. Although FIG. 1 shows five example containers 130 having particular structures and components, any other containers having various shapes, structures, or components may also encode sounds that are emitted responsive to opening of the containers.

Encoded sounds may be associated with any portions of the containers 130, including any of the seams 132, covers, doors, flaps, or endcaps 134, or other surfaces, edges, or portions 136 of the containers, as described herein at least with respect to FIGS. 2A-4F. For example, the encoded sounds may be emitted responsive to opening of any of the seams, covers, doors, flaps, endcaps, surfaces, edges, or other portions of the containers.

FIGS. 2A-2J are schematic diagrams of example embodiments 200 of containers having associated encoded sounds, according to an implementation.

Figure 2A:
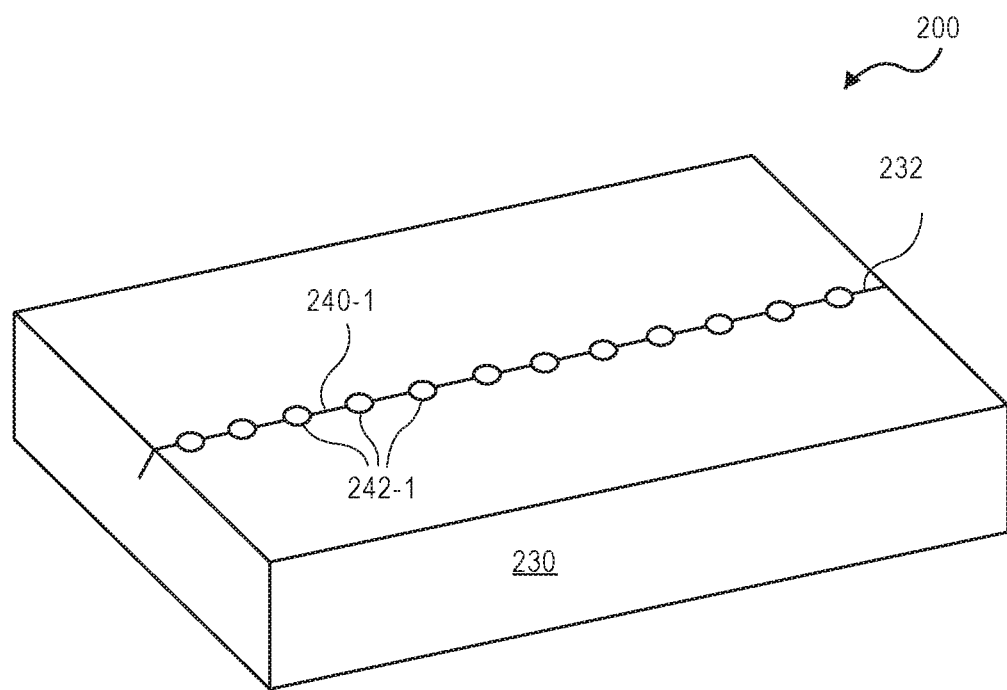
FIGS. 2A-2J are schematic diagrams of example embodiments of containers having associated encoded sounds, according to an implementation.

FIG. 2A shows a rectangular container 230 having a seam 232 along its top surface. For example, the rectangular container 230 may be a cardboard box having two upper flaps that meet substantially at the seam 232. In other embodiments, the seam 232 may be formed in any other surface or edge of the container, including any of the seams 132 of other rectangular containers, cylindrical containers, bags, pouches, other flexible containers, or other containers as described at least with respect to FIG. 1.

As shown in FIG. 2A, an example cord or string 240-1 may be embedded, formed in, or attached along the seam 232. In addition, the cord or string 240-1 may extend along a plurality of perforations 242-1. For example, the perforations may have any shape, e.g., circular, elliptical, triangular, rectangular, diamond, polygonal, or other shape. In addition, the perforations may be spaced along the cord or string 240-1 in any combination of spacings, e.g., small spacings, large spacings, regular spacings, irregular spacings, or others. In the example embodiment shown in FIG. 2A, the perforations 242-1 may have circular shapes and may have a regular spacing along the length of the cord or string 240-1.

Based at least in part on the shapes and/or spacings of the perforations, a particular or unique sound may be encoded along the cord or string 240-1. For example, responsive to pulling of the cord or string 240-1 to open the container, a unique sound or sequence of sounds may be emitted based at least in part on the shapes and/or spacings of the perforations. In the example embodiment shown in FIG. 2A, the circular, regularly-spaced perforations 242-1 may emit a regular sequence of sounds, with each perforation 242-1 emitting a sound similar to each other perforation 242-1.

Figure 2B:
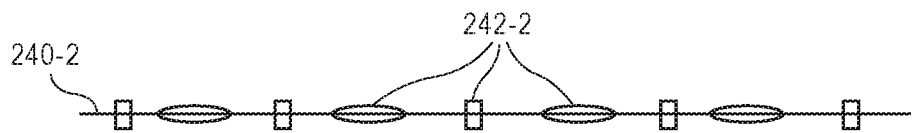

FIG. 2B shows, in an overhead view, another example cord or string 240-2 that may be embedded, formed in, or attached along a seam 132, 232. In addition, the cord or string 240-2 may extend along a plurality of perforations 242-2. For example, the perforations may have any shape, e.g., circular, elliptical, triangular, rectangular, diamond, polygonal, or other shape. In addition, the perforations may be spaced along the cord or string 240-2 in any combination of spacings, e.g., small spacings, large spacings, regular spacings, irregular spacings, or others. In the example embodiment shown in FIG. 2B, the perforations 242-2 may have alternating rectangular and elliptical shapes and may have a regular spacing along the length of the cord or string 240-2.

Based at least in part on the shapes and/or spacings of the perforations, a particular or unique sound may be encoded along the cord or string 240-2. For example, responsive to pulling of the cord or string 240-2 to open the container, a unique sound or sequence of sounds may be emitted based at least in part on the shapes and/or spacings of the perforations. In the example embodiment shown in FIG. 2B, the alternating rectangular and elliptical, regularly-spaced perforations 242-2 may emit a regular sequence of sounds, with each rectangular perforation 242-2 emitting a sound similar to each other rectangular perforation 242-2 and elliptical perforation 242-2 emitting a sound similar to each other elliptical perforation 242-2.

Figure 2C:
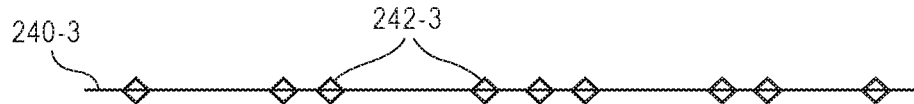

FIG. 2C shows, in an overhead view, another example cord or string 240-3 that may be embedded, formed in, or attached along a seam 132, 232. In addition, the cord or string 240-3 may extend along a plurality of perforations 242-3. For example, the perforations may have any shape, e.g., circular, elliptical, triangular, rectangular, diamond, polygonal, or other shape. In addition, the perforations may be spaced along the cord or string 240-3 in any combination of spacings, e.g., small spacings, large spacings, regular spacings, irregular spacings, or others. In the example embodiment shown in FIG. 2C, the perforations 242-3 may have diamond shapes and may have an irregular spacing along the length of the cord or string 240-3.

Based at least in part on the shapes and/or spacings of the perforations, a particular or unique sound may be encoded along the cord or string 240-3. For example, responsive to pulling of the cord or string 240-3 to open the container, a unique sound or sequence of sounds may be emitted based at least in part on the shapes and/or spacings of the perforations. In the example embodiment shown in FIG. 2C, the diamond-shaped, irregularly-spaced perforations 242-3 may emit an irregular sequence of sounds, with each diamond-shaped perforation 242-3 emitting a sound similar to each other diamond-shaped perforation 242-3.

Figure 2D:
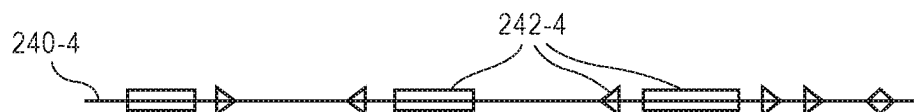

FIG. 2D shows, in an overhead view, another example cord or string 240-4 that may be embedded, formed in, or attached along a seam 132, 232. In addition, the cord or string 240-4 may extend along a plurality of perforations 242-4. For example, the perforations may have any shape, e.g., circular, elliptical, triangular, rectangular, diamond, polygonal, or other shape. In addition, the perforations may be spaced along the cord or string 240-4 in any combination of spacings, e.g., small spacings, large spacings, regular spacings, irregular spacings, or others. In the example embodiment shown in FIG. 2D, the perforations 242-4 may have rectangular, triangular, or diamond shapes and may have an irregular spacing along the length of the cord or string 240-4.

Based at least in part on the shapes and/or spacings of the perforations, a particular or unique sound may be encoded along the cord or string 240-4. For example, responsive to pulling of the cord or string 240-4 to open the container, a unique sound or sequence of sounds may be emitted based at least in part on the shapes and/or spacings of the perforations. In the example embodiment shown in FIG. 2D, the rectangular, triangular, and diamond-shaped, irregularly-spaced perforations 242-4 may emit an irregular sequence of sounds, with each rectangular perforation 242-4 emitting a sound similar to each other rectangular perforation 242-4, each left-pointing triangular perforation 242-4 emitting a sound similar to each other left-pointing triangular perforation 242-4, each right-pointing triangular perforation 242-4 emitting a sound similar to each other right-pointing triangular perforation 242-4, and each diamond-shaped perforation 242-4 emitting a sound similar to each other diamond-shaped perforation 242-4.

Figure 2E:
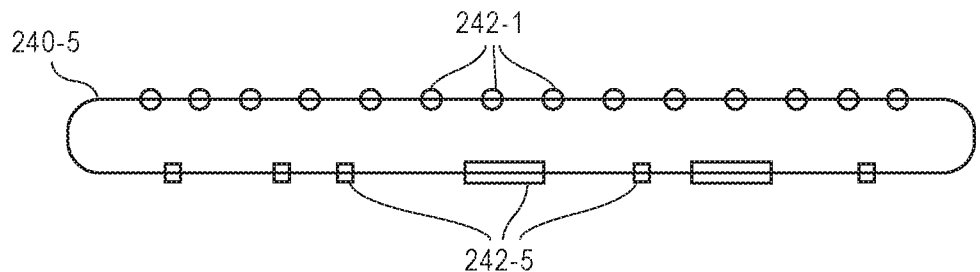

FIG. 2E shows, in an overhead view, another example cord or string 240-5 that may be embedded, formed in, or attached along a seam 132, 232. In addition, the cord or string 240-5 may extend along two pluralities of perforations 242-1, 242-5. For example, the perforations may have any shape, e.g., circular, elliptical, triangular, rectangular, diamond, polygonal, or other shape. In addition, the perforations may be spaced along the cord or string 240-5 in any combination of spacings, e.g., small spacings, large spacings, regular spacings, irregular spacings, or others. In the example embodiment shown in FIG. 2E, the plurality of perforations 242-1 may have circular shapes and may have a regular spacing along the length of the cord or string 240-5, and the plurality of perforations 242-5 may have rectangular shapes and may have an irregular spacing along the length of the cord or string 240-5.

Based at least in part on the shapes and/or spacings of the perforations, a particular or unique sound may be encoded along the cord or string 240-5. For example, responsive to pulling of the cord or string 240-5 to open the container, a unique sound or sequence of sounds may be emitted based at least in part on the shapes and/or spacings of the perforations. In the example embodiment shown in FIG. 2E, the circular, regularly-spaced perforations 242-1 may emit a regular sequence of sounds, with each circular perforation 242-1 emitting a sound similar to each other circular perforation 242-1, and the rectangular, irregularly-spaced perforations 242-5 may emit an irregular sequence of sounds, with each rectangular perforation 242-5 emitting a sound similar to each other similarly shaped rectangular perforation 242-5.

As shown in FIG. 2E, a combination of two or more pluralities of perforations that extend along a cord or string 240-5 that is simultaneously pulled through the two or more pluralities of perforations may enable different processing techniques to recognize the unique sound. For example, the plurality of perforations 242-1 may encode a reference sound, or reference audio signature, and the plurality of perforations 242-5 may encode a unique sound, or unique audio signature. Then, when processing the sounds received from the pluralities of perforations 242-1, 242-5, the reference sound associated with the perforations 242-1 may be identified and modified to have a known regular spacing associated with the reference sound, and the unique sound associated with the perforations 242-5 may then be identified from the sounds or sequence of sounds that have been modified based on the reference sound.

These processing techniques, as well as dynamic time warping and other techniques described herein, may allow the identification of unique sounds even if the rates of opening are different, e.g., faster or slower than an expected or normal rate, and also even if the rates of opening are inconsistent or variable, e.g., a portion of the opening was faster or slower than another portion of the opening, there were one or more pauses during the opening, or other inconsistencies during opening.

Figure 2F:
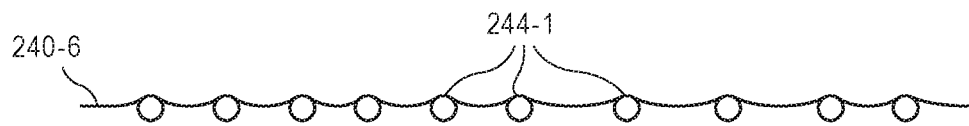

FIG. 2F shows, in a side view, another example cord or string 240-6 that may be embedded, formed in, or attached along a seam 132, 232. In addition, the cord or string 240-6 may extend along a plurality of air pockets 244-1, e.g., similar to bubble wrap. For example, the air pockets may have any shape, e.g., circular, elliptical, triangular, rectangular, diamond, polygonal, or other shape. In addition, the air pockets may be spaced along the cord or string 240-6 in any combination of spacings, e.g., small spacings, large spacings, regular spacings, irregular spacings, or others. In the example embodiment shown in FIG. 2F, the air pockets 244-1 may have circular shapes and may have a regular spacing along the length of the cord or string 240-6. Although FIG. 2F shows the cord or string 240-6 attached to upper surfaces of the air pockets 244-1, in other embodiments the cord or string 240-6 may instead be attached to other surfaces, e.g., lower surfaces or side surfaces, of the air pockets 244-1, or may extend through the air pockets 244-1.

Based at least in part on the shapes and/or spacings of the air pockets, a particular or unique sound may be encoded along the cord or string 240-6. For example, responsive to pulling of the cord or string 240-6 to open the container, a unique sound or sequence of sounds may be emitted based at least in part on the shapes and/or spacings of the air pockets. In the example embodiment shown in FIG. 2F, the circular, regularly-spaced air pockets 244-1 may emit a regular sequence of sounds, with each circular air pocket 244-1 emitting a sound similar to each other circular air pocket 244-1.

Figure 2G:
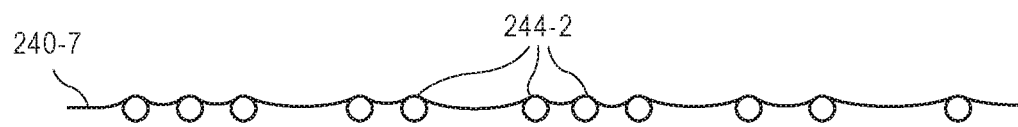

FIG. 2G shows, in a side view, another example cord or string 240-7 that may be embedded, formed in, or attached along a seam 132, 232. In addition, the cord or string 240-7 may extend along a plurality of air pockets 244-2, e.g., similar to bubble wrap. For example, the air pockets may have any shape, e.g., circular, elliptical, triangular, rectangular, diamond, polygonal, or other shape. In addition, the air pockets may be spaced along the cord or string 240-7 in any combination of spacings, e.g., small spacings, large spacings, regular spacings, irregular spacings, or others. In the example embodiment shown in FIG. 2G, the air pockets 244-2 may have circular shapes and may have an irregular spacing along the length of the cord or string 240-7. Although FIG. 2G shows the cord or string 240-7 attached to upper surfaces of the air pockets 244-2, in other embodiments the cord or string 240-7 may instead be attached to other surfaces, e.g., lower surfaces or side surfaces, of the air pockets 244-2, or may extend through the air pockets 244-2.

Based at least in part on the shapes and/or spacings of the air pockets, a particular or unique sound may be encoded along the cord or string 240-7. For example, responsive to pulling of the cord or string 240-7 to open the container, a unique sound or sequence of sounds may be emitted based at least in part on the shapes and/or spacings of the air pockets. In the example embodiment shown in FIG. 2G, the circular, irregularly-spaced air pockets 244-2 may emit an irregular sequence of sounds, with each circular air pocket 244-2 emitting a sound similar to each other circular air pocket 244-2.

The cords or strings 240 as described herein at least with respect to FIGS. 2A-2G may be formed of various materials, such as plastic, metal, natural fibers, synthetic fibers, or combinations thereof. In addition, the perforations or air pockets described herein may have any combinations of shapes and any combinations of spacings. For example, in some embodiments, the perforations or air pockets may have shapes and spacings such that the same unique sound is emitted when the cord or string is pulled from either end, i.e., the perforations or air pockets are symmetrical with respect to the ends of the cord or string. In other embodiments, the perforations or air pockets may not be symmetrical with respect to the ends of the cord or string, such that a first unique sound is emitted when the cord or string is pulled from a first end, and a second unique sound is emitted when the cord or string is pulled from a second, opposite end.

Figure 2H:
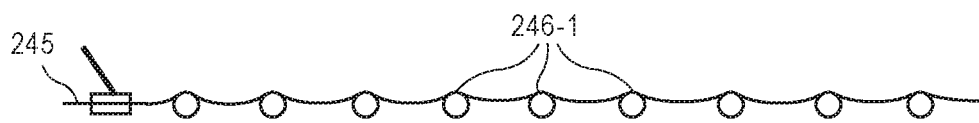

FIG. 2H shows, in a side view, an example zipper 245 that may be embedded, formed in, or attached along a seam 132, 232. In addition, the zipper 245 may extend along a plurality of air pockets 246-1, e.g., similar to bubble wrap. For example, the air pockets may have any shape, e.g., circular, elliptical, triangular, rectangular, diamond, polygonal, or other shape. In addition, the air pockets may be spaced along the zipper 245 in any combination of spacings, e.g., small spacings, large spacings, regular spacings, irregular spacings, or others. In the example embodiment shown in FIG.

2H, the air pockets 246-1 may have circular shapes and may have a regular spacing along the length of the zipper 245. Although FIG. 2H shows the zipper 245 extending along upper surfaces of the air pockets 246-1, in other embodiments the zipper 245 may instead extend along other surfaces, e.g., lower surfaces or side surfaces, of the air pockets 246-1.

Based at least in part on the shapes and/or spacings of the air pockets, a particular or unique sound may be encoded along the zipper 245. For example, responsive to pulling of the zipper 245 to open the container, a unique sound or sequence of sounds may be emitted based at least in part on the shapes and/or spacings of the air pockets. In the example embodiment shown in FIG. 2H, the circular, regularly-spaced air pockets 246-1 may emit a regular sequence of sounds, with each circular air pocket 246-1 emitting a sound similar to each other circular air pocket 246-1.

The zipper 245 as described herein at least with respect to FIG. 2H may be formed of various materials, such as plastic, metal, composites, or combinations thereof. In addition, the air pockets described herein may have any combinations of shapes and any combinations of spacings. For example, in some embodiments, the air pockets may have shapes and spacings such that the same unique sound is emitted when the zipper is pulled from either end, i.e., the air pockets are symmetrical with respect to the ends of the zipper. In other embodiments, the air pockets may not be symmetrical with respect to the ends of the zipper, such that a first unique sound is emitted when the zipper is pulled from a first end, and a second unique sound is emitted when the zipper is pulled from a second, opposite end.

Similar to the description at least with respect to FIG. 2E, a combination of two or more pluralities of air pockets that extend along a cord, string, or zipper that is simultaneously pulled through the two or more pluralities of air pockets may enable different processing techniques to recognize the unique sound. For example, a first plurality of air pockets may encode a reference sound, or reference audio signature, and a second plurality of air pockets may encode a unique sound, or unique audio signature. Then, when processing the sounds received from the pluralities of air pockets, the reference sound associated with the first plurality of air pockets may be identified and modified to have a known regular spacing associated with the reference sound, and the unique sound associated with the second plurality of air pockets may then be identified from the sounds or sequence of sounds that have been modified based on the reference sound.

These processing techniques, as well as dynamic time warping and other techniques described herein, may allow the identification of unique sounds even if the rates of opening are different, e.g., faster or slower than an expected or normal rate, and also even if the rates of opening are inconsistent or variable, e.g., a portion of the opening was faster or slower than another portion of the opening, there were one or more pauses during the opening, or other inconsistencies during opening.

Figure 2I:
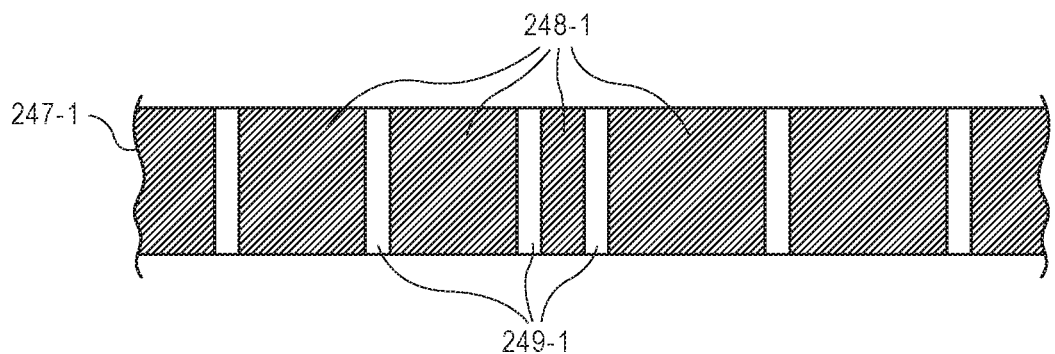

FIG. 2I shows, in an overhead view, an example tape 247-1 that may be attached along a seam 132, 232. In addition, the tape 247-1 may include a plurality of adhesive sections 248-1 and a plurality of non-adhesive sections 249-1. For example, the adhesive and non-adhesive sections may have any shape, e.g., circular, elliptical, triangular, rectangular, diamond, polygonal, or other shape. In addition, the adhesive and non-adhesive sections may be spaced along the tape 247-1 in any combination of spacings, e.g., small spacings, large spacings, regular spacings, irregular spacings, or others. In the example embodiment shown in FIG. 2I, the adhesive sections 248-1 and non-adhesive sections 249-1 may have rectangular shapes and may have an irregular spacing along the length of the tape 247-1.

Based at least in part on the shapes and/or spacings of the adhesive and non-adhesive sections, a particular or unique sound may be encoded along the tape 247-1. For example, responsive to pulling or removal of the tape 247-1 to open the container, a unique sound or sequence of sounds may be emitted based at least in part on the shapes and/or spacings of the adhesive and non-adhesive sections. In the example embodiment shown in FIG. 2I, the rectangular, irregularly-spaced adhesive and non-adhesive sections may emit an irregular sequence of sounds, with each rectangular adhesive section 248-1 emitting a sound similar to each other rectangular adhesive section 248-1 of similar size, and each rectangular non-adhesive section 249-1 emitting a sound similar to each other rectangular non-adhesive section 249-1 of similar size.

Figure 2J:
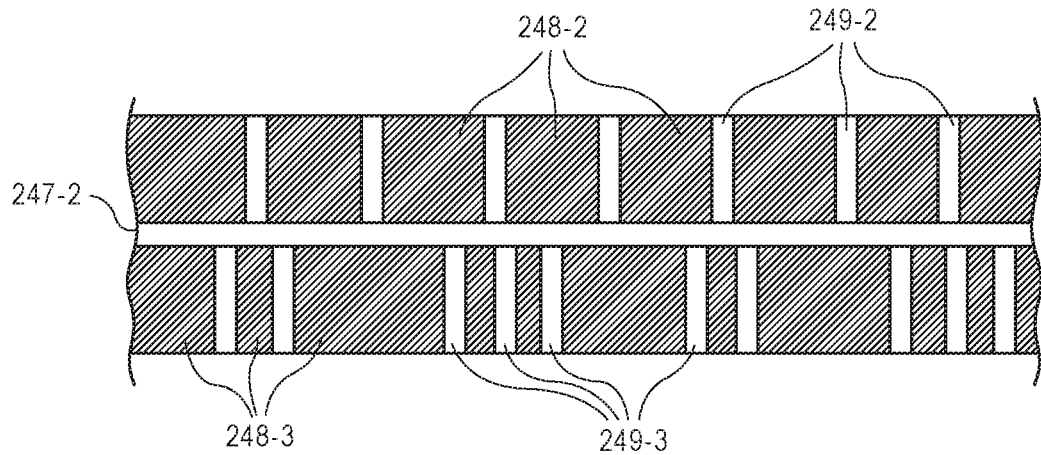

FIG. 2J shows, in an overhead view, another example tape 247-2 that may be embedded or attached along a seam 132, 232. In addition, the tape 247-2 may extend in two portions, a first portion having a plurality of adhesive sections 248-2 and a plurality of non-adhesive sections 249-2, and a second portion having a plurality of adhesive sections 248-3 and a plurality of non-adhesive sections 249-3. For example, the adhesive and non-adhesive sections may have any shape, e.g., circular, elliptical, triangular, rectangular, diamond, polygonal, or other shape. In addition, the adhesive and non-adhesive sections may be spaced along the tape 247-2 in any combination of spacings, e.g., small spacings, large spacings, regular spacings, irregular spacings, or others. In the example embodiment shown in FIG. 2J, the plurality of adhesive and non-adhesive sections 248-2, 249-2 may have rectangular shapes and may have a regular spacing along the length of the tape 247-2, and the plurality of adhesive and non-adhesive sections 248-3, 249-3 may have rectangular shapes and may have an irregular spacing along the length of the tape 247-2.

Based at least in part on the shapes and/or spacings of the adhesive and non-adhesive sections, a particular or unique sound may be encoded along the tape 247-2. For example, responsive to pulling or removal of the tape 247-2 to open the container, a unique sound or sequence of sounds may be emitted based at least in part on the shapes and/or spacings of the adhesive and non-adhesive sections. In the example embodiment shown in FIG. 2J, the rectangular, regularly-spaced adhesive and non-adhesive sections 248-2, 249-2 may emit a regular sequence of sounds, with each adhesive section 248-2 emitting a sound similar to each other adhesive section 248-2 of similar size, and each non-adhesive section 249-2 emitting a sound similar to each other non-adhesive section 249-2 of similar size. Likewise, the rectangular, irregularly-spaced adhesive and non-adhesive sections 248-3, 249-3 may emit an irregular sequence of sounds, with each adhesive section 248-3 emitting a sound similar to each other adhesive section 248-3 of similar size, and each non-adhesive section 249-3 emitting a sound similar to each other non-adhesive section 249-3 of similar size.

As shown in FIG. 2J, a combination of two or more portions of adhesive and non-adhesive sections that extend along a tape 247-2 that is simultaneously pulled through the two or more portions may enable different processing techniques to recognize the unique sound. For example, the plurality of adhesive and non-adhesive sections 248-2, 249-2 may encode a reference sound, or reference audio signature, and the plurality of adhesive and non-adhesive sections 248-3, 249-3 may encode a unique sound, or unique audio signature. Then, when processing the sounds received from the pluralities of adhesive and non-adhesive sections, the reference sound associated with the adhesive and non-adhesive sections 248-2, 249-2 may be identified and modified to have a known regular spacing associated with the reference sound, and the unique sound associated with the adhesive and non-adhesive sections 248-3, 249-3 may then be identified from the sounds or sequence of sounds that have been modified based on the reference sound.

These processing techniques, as well as dynamic time warping and other techniques described herein, may allow the identification of unique sounds even if the rates of opening are different, e.g., faster or slower than an expected or normal rate, and also even if the rates of opening are inconsistent or variable, e.g., a portion of the opening was faster or slower than another portion of the opening, there were one or more pauses during the opening, or other inconsistencies during opening.

The tapes 247 as described herein at least with respect to FIGS. 2I-2J may be formed of various materials, such as plastic, natural fibers or materials, synthetic fibers or materials, or combinations thereof, and the adhesives on the adhesive sections may be formed of any known adhesive materials or combinations thereof. Further, the tapes 247 may also be adhered to various types of materials of containers, such as cardboard, paper, plastic, or other materials, that may result in different emitted sounds upon removal of the tapes 247, and such container materials may also include patterns, shapes, or other structures to encode particular sounds upon removal or tearing of the tapes 247 and/or portions of the container materials. In addition, the adhesive and non-adhesive sections described herein may have any combinations of shapes and any combinations of spacings. For example, in some embodiments, the adhesive and non-adhesive sections may have shapes and spacings such that the same unique sound is emitted when the tape is pulled from either end, i.e., the adhesive and non-adhesive sections are symmetrical with respect to the ends of the tape. In other embodiments, the adhesive and non-adhesive sections may not be symmetrical with respect to the ends of the tape, such that a first unique sound is emitted when the tape is pulled from a first end, and a second unique sound is emitted when the tape is pulled from a second, opposite end.

Although FIGS. 2A-2J describe particular example embodiments, various aspects of the example embodiments may be combined in various manners to encode sounds in association with containers or compartment of containers. For example, the combinations of shapes and/or spacings of perforations, air pockets, and/or adhesive and non-adhesive sections are not limited to the particular example embodiments shown.

FIGS. 3A-3E are schematic diagrams of further example embodiments 300 of containers having associated encoded sounds, according to an implementation.

Figure 3A:
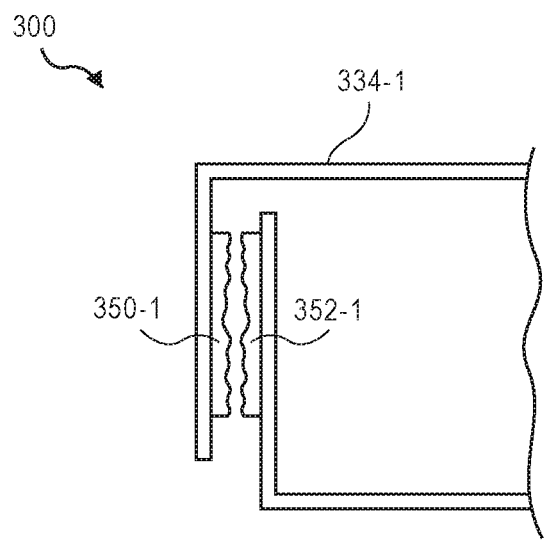
FIGS. 3A-3E are schematic diagrams of further example embodiments of containers having associated encoded sounds, according to an implementation.

FIG. 3A shows, in a partial cross-sectional view, a portion of a rectangular container having a cover, door, or flap 334-1 that may be moved relative to a remainder of the container, e.g., base and/or sidewalls, to open the container. For example, the rectangular container may be a cardboard box having a removable or hinged cover, door, or flap 334-1. In other embodiments, the cover, door, or flap 334-1 may be formed in any other surface or portion of the container, including any of the covers, doors, flaps, or endcaps 134 of other rectangular containers, cylindrical containers, or other containers as described at least with respect to FIG. 1.

As shown in FIG. 3A, a first material 350-1 may be embedded, formed in, or attached along a surface of the cover, door, or flap 334-1 that interfaces or contacts a surface of a remainder of the container, e.g., a sidewall. For example, the first material 350-1 may have any shape or size, e.g., rectilinear, circular, elliptical, triangular, rectangular, polygonal, or other shape. In addition, the first material 350-1 may extend any length of the cover, door, or flap 334-1 along a direction of movement of the cover, door, or flap relative to the sidewall. In the example embodiment shown in FIG. 3A, the first material 350-1 may have a rectilinear shape and may extend substantially along an entire length of the cover, door, or flap 334-1 along a direction of movement of the cover, door, or flap relative to the sidewall.

As shown in FIG. 3A, in some embodiments, a second material 352-1 may also be embedded, formed in, or attached along a surface of the remainder of the container, e.g., the sidewall, to interface or contact at least a portion of the first material 350-1. For example, the second material 352-1 may have any shape or size, e.g., rectilinear, circular, elliptical, triangular, rectangular, polygonal, or other shape. In addition, the second material 352-1 may extend any length of the sidewall along a direction of movement of the cover, door, or flap relative to the sidewall. In the example embodiment shown in FIG. 3A, the second material 352-1 may have a rectilinear shape and may also extend substantially along an entire length of the sidewall along a direction of movement of the cover, door, or flap relative to the sidewall.

Based at least in part on the shapes, sizes, and/or characteristics of the first material and/or the second material, a particular or unique sound may be encoded by the first material 350-1 and/or the second material 352-1. In the example embodiment shown in FIG. 3A, responsive to movement of the cover, door, or flap 334-1 to open the container, a unique sound or sequence of sounds may be emitted based at least in part on the shapes, sizes, and/or characteristics of the first material and/or the second material.

Figure 3B:
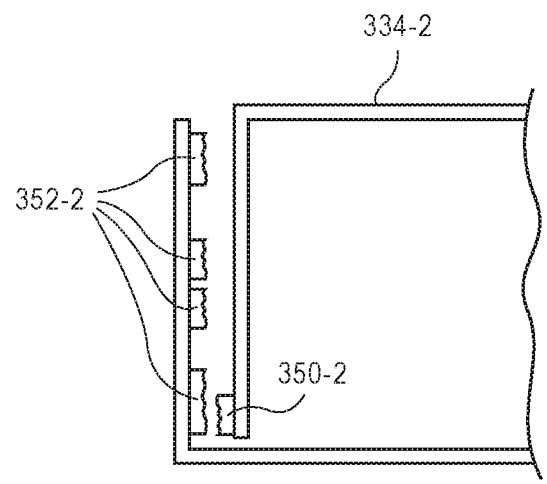

FIG. 3B shows, in a partial cross-sectional view, a portion of a rectangular container having a cover, door, or flap 334-2 that may be moved relative to a remainder of the container, e.g., base and/or sidewalls, to open the container. For example, the rectangular container may be a cardboard box having a removable or hinged cover, door, or flap 334-2. In other embodiments, the cover, door, or flap 334-2 may be formed in any other surface or portion of the container, including any of the covers, doors, flaps, or endcaps 134 of other rectangular containers, cylindrical containers, or other containers as described at least with respect to FIG. 1.

As shown in FIG. 3B, a first material 350-2 may be embedded, formed in, or attached along a surface of the cover, door, or flap 334-2 that interfaces or contacts a surface of a remainder of the container, e.g., a sidewall. For example, the first material 350-2 may have any shape or size, e.g., rectilinear, circular, elliptical, triangular, rectangular, polygonal, or other shape. In addition, the first material 350-2 may be located at one or more portions of the cover, door, or flap 334-2 along a direction of movement of the cover, door, or flap relative to the sidewall. In the example embodiment shown in FIG. 3B, the first material 350-2 may have a rectangular, circular, or other shape and may be located near a bottom edge of the cover, door, or flap 334-2.

As shown in FIG. 3B, in some embodiments, a second material 352-2 may also be embedded, formed in, or attached along a surface of the remainder of the container, e.g., the sidewall, to interface or contact at least a portion of the first material 350-2. For example, the second material 352-2 may have any shape or size, e.g., rectilinear, circular, elliptical, triangular, rectangular, polygonal, or other shape. In addition, the second material 352-2 may be located at one or more portions of the sidewall along a direction of movement of the cover, door, or flap relative to the sidewall. Further, the second material 352-2 may be spaced along the sidewall in any combination of spacings, e.g., small spacings, large spacings, regular spacings, irregular spacings, or others. In the example embodiment shown in FIG. 3B, the second material 352-2 may have rectangular, circular, or other shapes and may have an irregular spacing on the sidewall along a direction of movement of the cover, door, or flap relative to the sidewall.

Based at least in part on the shapes, sizes, spacings, and/or characteristics of the first material and/or the second material, a particular or unique sound may be encoded by the first material 350-2 and/or the second material 352-2. In the example embodiment shown in FIG. 3B, responsive to movement of the cover, door, or flap 334-2 to open the container, a unique sound or sequence of sounds may be emitted based at least in part on the shapes, sizes, spacings, and/or characteristics of the first material and/or the second material.

Figure 3C:
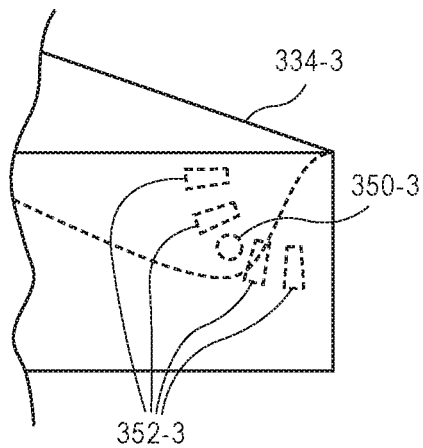

FIG. 3C shows, in a partial side view, a portion of a rectangular container having a cover, door, or flap 334-3 that may be moved relative to a remainder of the container, e.g., base and/or sidewalls, to open the container. For example, the rectangular container may be a cardboard box having a hinged cover, door, or flap 334-3. In other embodiments, the cover, door, or flap 334-3 may be formed in any other surface or portion of the container, including any of the covers, doors, flaps, or endcaps 134 of other rectangular containers, cylindrical containers, or other containers as described at least with respect to FIG. 1.

As shown in FIG. 3C, a first material 350-3 may be embedded, formed in, or attached along a surface of the cover, door, or flap 334-3 that interfaces or contacts a surface of a remainder of the container, e.g., a sidewall. For example, the first material 350-3 may have any shape or size, e.g., rectilinear, circular, elliptical, triangular, rectangular, polygonal, or other shape. In addition, the first material 350-3 may be located at one or more portions of the cover, door, or flap 334-3 along a direction of movement of the cover, door, or flap relative to the sidewall. In the example embodiment shown in FIG. 3C, the first material 350-3 may have a circular shape and may be located near a lower corner of the cover, door, or flap 334-3.

As shown in FIG. 3C, in some embodiments, a second material 352-3 may also be embedded, formed in, or attached along a surface of the remainder of the container, e.g., the sidewall, to interface or contact at least a portion of the first material 350-3. For example, the second material 352-3 may have any shape or size, e.g., rectilinear, circular, elliptical, triangular, rectangular, polygonal, or other shape. In addition, the second material 352-3 may be located at one or more portions of the sidewall along a direction of movement of the cover, door, or flap relative to the sidewall. Further, the second material 352-3 may be spaced along the sidewall in any combination of spacings, e.g., small spacings, large spacings, regular spacings, irregular spacings, or others. In the example embodiment shown in FIG. 3C, the second material 352-3 may have rectangular, trapezoidal, or other shapes and may have a regular spacing on the sidewall along a direction of movement of the cover, door, or flap relative to the sidewall.

Based at least in part on the shapes, sizes, spacings, and/or characteristics of the first material and/or the second material, a particular or unique sound may be encoded by the first material 350-3 and/or the second material 352-3. In the example embodiment shown in FIG. 3C, responsive to movement of the cover, door, or flap 334-3 to open the container, a unique sound or sequence of sounds may be emitted based at least in part on the shapes, sizes, spacings, and/or characteristics of the first material and/or the second material.

Figure 3D:
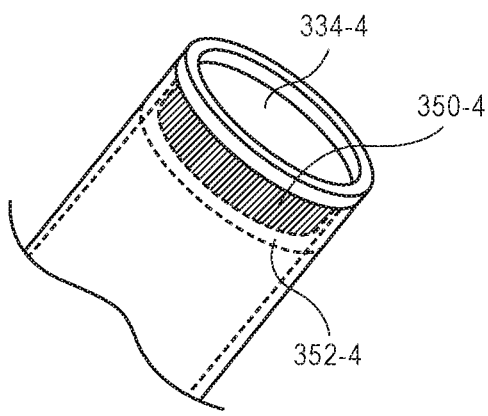

FIG. 3D shows, in a partial perspective view, a portion of a cylindrical container having an endcap 334-4 that may be moved relative to a remainder of the container, e.g., cylindrical sidewall, to open the container. For example, the cylindrical container may be a shipping tube having an endcap 334-4 that is removable by sliding or pulling. In other embodiments, the endcap 334-4 may be formed in any other surface or portion of the container, including any of the covers, doors, flaps, or endcaps 134 of other rectangular containers, cylindrical containers, or other containers as described at least with respect to FIG. 1.

As shown in FIG. 3D, a first material 350-4 may be embedded, formed in, or attached along a surface of the endcap 334-4 that interfaces or contacts a surface of a remainder of the container, e.g., a cylindrical sidewall. For example, the first material 350-4 may have any shape or size, e.g., rectilinear, circular, elliptical, triangular, rectangular, polygonal, or other shape. In addition, the first material 350-4 may be located at one or more portions of the endcap 334-4 along a direction of movement of the endcap relative to the sidewall. In the example embodiment shown in FIG. 3D, the first material 350-4 may have a rectangular shape that extends substantially around a periphery of the endcap 334-4.

As shown in FIG. 3D, in some embodiments, a second material 352-4 may also be embedded, formed in, or attached along a surface of the remainder of the container, e.g., the cylindrical sidewall, to interface or contact at least a portion of the first material 350-4. For example, the second material 352-4 may have any shape or size, e.g., rectilinear, circular, elliptical, triangular, rectangular, polygonal, or other shape. In addition, the second material 352-4 may be located at one or more portions of the sidewall along a direction of movement of the endcap relative to the sidewall. In the example embodiment shown in FIG. 3D, the second material 352-4 may have a rectangular shape that also extends substantially around a periphery of the cylindrical sidewall.

Based at least in part on the shapes, sizes, and/or characteristics of the first material and/or the second material, a particular or unique sound may be encoded by the first material 350-4 and/or the second material 352-4. In the example embodiment shown in FIG. 3D, responsive to pulling or sliding of the endcap 334-4 to open the container, a unique sound or sequence of sounds may be emitted based at least in part on the shapes, sizes, and/or characteristics of the first material and/or the second material.

Figure 3E:
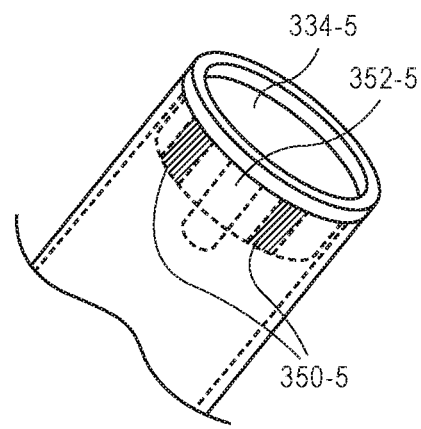

FIG. 3E shows, in a partial perspective view, a portion of a cylindrical container having an endcap 334-5 that may be moved relative to a remainder of the container, e.g., cylindrical sidewall, to open the container. For example, the cylindrical container may be a shipping tube having an endcap 334-5 that is removable by rotating or unscrewing. In other embodiments, the endcap 334-5 may be formed in any other surface or portion of the container, including any of the covers, doors, flaps, or endcaps 134 of other rectangular containers, cylindrical containers, or other containers as described at least with respect to FIG. 1.

As shown in FIG. 3E, a first material 350-5 may be embedded, formed in, or attached along a surface of the endcap 334-5 that interfaces or contacts a surface of a remainder of the container, e.g., a cylindrical sidewall. For example, the first material 350-5 may have any shape or size, e.g., rectilinear, circular, elliptical, triangular, rectangular, polygonal, or other shape. In addition, the first material 350-5 may be located at one or more portions of the endcap 334-5 along a direction of movement of the endcap relative to the sidewall. Further, the first material 350-5 may be spaced around the endcap in any combination of spacings, e.g., small spacings, large spacings, regular spacings, irregular spacings, or others. In the example embodiment shown in FIG. 3E, the first material 350-5 may have rectangular shapes and may have a regular spacing around a periphery of the endcap 334-5.

As shown in FIG. 3E, in some embodiments, a second material 352-5 may also be embedded, formed in, or attached along a surface of the remainder of the container, e.g., the cylindrical sidewall, to interface or contact at least a portion of the first material 350-5. For example, the second material 352-5 may have any shape or size, e.g., rectilinear, circular, elliptical, triangular, rectangular, polygonal, or other shape. In addition, the second material 352-5 may be located at one or more portions of the sidewall along a direction of movement of the endcap relative to the sidewall. Further, the second material 352-5 may be spaced along the sidewall in any combination of spacings, e.g., small spacings, large spacings, regular spacings, irregular spacings, or others. In the example embodiment shown in FIG. 3E, the second material 352-5 may have a rectangular shape and may be located at one portion of a periphery of the sidewall.

Based at least in part on the shapes, sizes, spacings, and/or characteristics of the first material and/or the second material, a particular or unique sound may be encoded by the first material 350-5 and/or the second material 352-5. In the example embodiment shown in FIG. 3E, responsive to rotating or unscrewing of the endcap 334-5 to open the container, a unique sound or sequence of sounds may be emitted based at least in part on the shapes, sizes, spacings, and/or characteristics of the first material and/or the second material.

The first materials 350 and second materials 352 as described herein at least with respect to FIGS. 3A-3E may be formed of various materials, such as sandpaper having different levels of grit, Velcro of different types, fabrics, natural fibers or materials, synthetic fibers or materials, plastics, metals, composites, or combinations thereof. In addition, the various materials may also include various surface treatments such as protrusions, bumps, depressions, peaks, valleys, or other surface formations or variations. In alternative embodiments, instead of or in addition to embedding, forming, or attaching first and/or second materials to containers, portions of the containers may be modified to include surface treatments that may encode sounds when interfacing with other portions of the containers that may or may not have additional surface treatments.

Further, although the example embodiments described herein refer to a first material on one surface and a second material on a second surface, any numbers, combinations, or arrangements of different materials on the same or different surfaces are also possible to encode sounds in association with containers. For example, a cover, door, flap, or endcap of a container may include multiple different types of materials, with various shapes, sizes, and/or spacings, on its surface that interface with a remainder of the container. Likewise, a base or sidewall of a container may include multiple different types of materials, with various shapes, sizes, and/or spacings, on its surface that interface with a cover, door, flap, or endcap of a container.

Moreover, as described herein, a combination of two or more portions of interfacing materials on surfaces of a container that simultaneously move relative to each other during opening may enable different processing techniques to recognize the unique sound. For example, a first portion having one or more materials may encode a reference sound, or reference audio signature, and a second portion having one or more materials may encode a unique sound, or unique audio signature. Then, when processing the sounds received from the plurality of portions of materials, the reference sound associated with the first portion may be identified and modified to have a known regular spacing associated with the reference sound, and the unique sound associated with the second portion may then be identified from the sounds or sequence of sounds that have been modified based on the reference sound.

These processing techniques, as well as dynamic time warping and other techniques described herein, may allow the identification of unique sounds even if the rates of opening are different, e.g., faster or slower than an expected or normal rate, and also even if the rates of opening are inconsistent or variable, e.g., a portion of the opening was faster or slower than another portion of the opening, there were one or more pauses during the opening, or other inconsistencies during opening.

Although FIGS. 3A-3E describe particular example embodiments, various aspects of the example embodiments may be combined in various manners to encode sounds in association with containers or compartment of containers. For example, the combinations of types, shapes, sizes, and/or spacings of materials are not limited to the particular example embodiments shown.

FIGS. 4A-4F are schematic diagrams of still further example embodiments 400 of containers having associated encoded sounds, according to an implementation.

FIG. 4A shows, in a partial cross-sectional view, a portion of a rectangular container having a surface 436-1 that may be moved relative to a remainder of the container, e.g., base and/or sidewalls, to open the container. For example, the rectangular container may be a substantially airtight, cardboard box having a removable or hinged cover, door, or flap, of which the surface 436-1 may form a portion. In other embodiments, the surface 436-1 may be formed in any other surface or portion of the container, including any of the covers, doors, flaps, or endcaps 134 or surfaces, edges, or other portions 136 of other rectangular containers, cylindrical containers, or other containers as described at least with respect to FIG. 1.

As shown in FIG. 4A, one or more pipes or tubes 460-1 may be embedded, formed in, or attached to the surface 436-1. For example, the pipes 460-1 may have any cross-sectional shape, e.g., circular, elliptical, triangular, rectangular, polygonal, or other shape. In addition, the pipes 460-1 may extend any length into an interior of the container. In the example embodiment shown in FIG. 4A, a first pipe 460-1 may have a circular cross-sectional shape and may extend a relatively shorter distance into the interior of the container, and a second pipe 460-1 may have a circular cross-sectional shape and may extend a relatively longer distance into the interior of the container.

Based at least in part on the shapes, lengths, and/or characteristics of the pipes, a particular or unique sound may be encoded by the pipes 460-1. In the example embodiment shown in FIG. 4A, responsive to movement of the cover, door, or flap to open the container, air may be forced to pass through the pipes 460-1, and a unique sound or sequence of sounds may be emitted based at least in part on the shapes, lengths, and/or characteristics of the pipes.

FIG. 4B shows, in a partial cross-sectional view, a portion of a rectangular container having a surface 436-2 that may be moved relative to a remainder of the container, e.g., base and/or sidewalls, to open the container. For example, the rectangular container may be a substantially airtight, cardboard box having a removable or hinged cover, door, or flap, of which the surface 436-2 may form a portion. In other embodiments, the surface 436-2 may be formed in any other surface or portion of the container, including any of the covers, doors, flaps, or endcaps 134 or surfaces, edges, or other portions 136 of other rectangular containers, cylindrical containers, or other containers as described at least with respect to FIG. 1.

As shown in FIG. 4B, one or more pipes or tubes 460-2 may be embedded, formed in, or attached to the surface 436-2. For example, the pipes 460-2 may have any cross-sectional shape, e.g., circular, elliptical, triangular, rectangular, polygonal, or other shape. In addition, the pipes 460-2 may extend any length into an interior of the container. Further, one or more other portions of the container may include or act as occluding members to block one or more of the pipes 460-2. In the example embodiment shown in FIG. 4B, four different pipes 460-1 may have circular cross-sectional shapes and may extend different respective distances into the interior of the container, and a portion of the container sidewall may act as an occluding member to block one or more of the pipes 460-2.

Based at least in part on the shapes, lengths, and/or characteristics of the pipes, a particular or unique sound may be encoded by the pipes 460-2. In the example embodiment shown in FIG. 4B, responsive to movement of the cover, door, or flap to open the container, air may be forced to pass through the pipes 460-2 sequentially as each of the pipes is moved away from, e.g., lifted above, the container sidewall that acts as an occluding member, and a unique sound or sequence of sounds may be emitted based at least in part on the shapes, lengths, and/or characteristics of the pipes and the occluding member.

FIG. 4C shows, in a partial perspective view, a portion of a cylindrical container having a surface 436-3 that may be moved relative to a remainder of the container, e.g., base and/or sidewalls, to open the container. For example, the cylindrical container may be a substantially airtight, shipping tube having a removable endcap, of which the surface 436-3 may form a portion. In other embodiments, the surface 436-3 may be formed in any other surface or portion of the container, including any of the covers, doors, flaps, or endcaps 134 or surfaces, edges, or other portions 136 of other rectangular containers, cylindrical containers, or other containers as described at least with respect to FIG. 1.

As shown in FIG. 4C, one or more pipes or tubes 460-3 may be embedded, formed in, or attached to the surface 436-3. For example, the pipes 460-3 may have any cross-sectional shape, e.g., circular, elliptical, triangular, rectangular, polygonal, or other shape. In addition, the pipes 460-3 may extend any length into an interior of the container. Further, one or more other portions of the container may include or act as an occluding member 462-3 to block one or more of the pipes 460-3. For example, the occluding member 462-3 may be a semi-circular, pie-shaped, or other insert or portion of the container that blocks one or more pipes 460-3. In the example embodiment shown in FIG. 4C, the pipes 460-3 may have circular cross-sectional shapes and may extend different respective distances into the interior of the container, and the occluding member 462-3 may have a semi-circular shape to block one or more of the pipes 460-3 when located adjacent the occluding member 462-3.

As shown in FIG. 4C, in some embodiments, one or more pipes or tubes 460-4 may also be embedded, formed in, or attached to a surface 436-4 of the remainder of the container, e.g., the sidewall. In other embodiments, the surface 436-4 may be formed in any other surface or portion of the container, including any of the surfaces, edges, or other portions 136 of other rectangular containers, cylindrical containers, or other containers as described at least with respect to FIG. 1. For example, the pipes 460-4 may have any cross-sectional shape, e.g., circular, elliptical, triangular, rectangular, polygonal, or other shape. In addition, the pipes 460-4 may extend any length into an interior of the container. In the example embodiment shown in FIG. 4C, the pipes 460-4 may have circular cross-sectional shapes and may extend different respective distances into the interior of the container.

Based at least in part on the shapes, lengths, and/or characteristics of the pipes, a particular or unique sound may be encoded by the pipes 460-3, 460-4. In the example embodiment shown in FIG. 4C, responsive to movement of the endcap to open the container, air may be forced to pass through the pipes 460-3 sequentially as each of the pipes is moved away, e.g., rotated, from the occluding member 462-3, and/or air may be forced to pass through the pipes 460-4, and a unique sound or sequence of sounds may be emitted based at least in part on the shapes, lengths, and/or characteristics of the pipes and/or the occluding member.

FIG. 4D shows, in a partial perspective view, a portion of a cylindrical container having a surface 436-5 that may be moved relative to a remainder of the container, e.g., base and/or sidewalls, to open the container. For example, the cylindrical container may be a substantially airtight, shipping tube having a removable, slidable endcap, of which the surface 436-5 may form a portion. In other embodiments, the surface 436-5 may be formed in any other surface or portion of the container, including any of the covers, doors, flaps, or endcaps 134 or surfaces, edges, or other portions 136 of other rectangular containers, cylindrical containers, or other containers as described at least with respect to FIG. 1.

As shown in FIG. 4D, one or more pipes or tubes 460-5 may be embedded, formed in, or attached to the surface 436-5. For example, the pipes 460-5 may have any cross-sectional shape, e.g., circular, elliptical, triangular, rectangular, polygonal, or other shape. In addition, the pipes 460-5 may extend any length into an interior of the endcap. Further, one or more other portions of the container, e.g., base and/or sidewalls, may include or act as an occluding member to block one or more of the pipes 460-5. In the example embodiment shown in FIG. 4D, the pipes 460-5 may have circular cross-sectional shapes and may extend different respective distances into the interior of the endcap, and the sidewall may act as an occluding member to block one or more of the pipes 460-5 during removal or sliding of the endcap.

Based at least in part on the shapes, lengths, and/or characteristics of the pipes, a particular or unique sound may be encoded by the pipes 460-5. In the example embodiment shown in FIG. 4D, responsive to removal or sliding movement of the endcap to open the container, air may be forced to pass through the pipes 460-5 sequentially as each of the pipes is moved away from, e.g., removed beyond, the sidewall that acts as an occluding member, and a unique sound or sequence of sounds may be emitted based at least in part on the shapes, lengths, and/or characteristics of the pipes and/or the occluding member.

FIG. 4E shows, in a partial perspective view, a portion of a cylindrical container having a surface 436-6 that may be moved relative to a remainder of the container, e.g., base and/or sidewalls, to open the container. For example, the cylindrical container may be a substantially airtight, shipping tube having a removable, rotatable endcap, e.g., having screw-like threads, of which the surface 436-6 may form a portion. In other embodiments, the surface 436-6 may be formed in any other surface or portion of the container, including any of the covers, doors, flaps, or endcaps 134 or surfaces, edges, or other portions 136 of other rectangular containers, cylindrical containers, or other containers as described at least with respect to FIG. 1.

As shown in FIG. 4E, one or more pipes or tubes 460-6 may be embedded, formed in, or attached to the surface 436-6. For example, the pipes 460-6 may have any cross-sectional shape, e.g., circular, elliptical, triangular, rectangular, polygonal, or other shape. In addition, the pipes 460-6 may extend any length into an interior of the endcap. Further, one or more other portions of the container, e.g., base and/or sidewalls, may include or act as an occluding member to block one or more of the pipes 460-6 except when the one or more pipes 460-6 is adjacent a window or opening 462-6 in the sidewall. In the example embodiment shown in FIG. 4E, the pipes 460-6 may have circular cross-sectional shapes and may extend different respective distances into the interior of the endcap, and the sidewall may act as an occluding member to block one or more of the pipes 460-6 during removal or rotation of the endcap, except when the one or more pipes 460-6 is adjacent the window or opening 462-6 in the sidewall.

Based at least in part on the shapes, lengths, and/or characteristics of the pipes, a particular or unique sound may be encoded by the pipes 460-6. In the example embodiment shown in FIG. 4E, responsive to rotating movement of the endcap to open the container, air may be forced to pass through the pipes 460-6 sequentially as each of the pipes is moved, e.g., rotated, toward the window or opening 462-6 of the sidewall that acts as an occluding member, and a unique sound or sequence of sounds may be emitted based at least in part on the shapes, lengths, and/or characteristics of the pipes, the occluding member, and/or the window or opening of the occluding member.

FIG. 4F shows, in a partial perspective view, a portion of a pouch, bag, or other flexible container having a surface 436-7 that may be moved relative to a remainder of the container, e.g., base and/or sidewalls, to open the container. For example, the flexible container may be a substantially airtight, shipping pouch, and the surface 436-7 may form a portion thereof. In other embodiments, the surface 436-7 may be formed in any other surface or portion of the container, including any of the surfaces, edges, or other portions 136 of other rectangular containers, cylindrical containers, or other containers as described at least with respect to FIG. 1.

As shown in FIG. 4F, one or more pipes or tubes 460-7 may be embedded, formed in, or attached to the surface 436-7. For example, the pipes 460-7 may have any cross-sectional shape, e.g., circular, elliptical, triangular, rectangular, polygonal, or other shape. In addition, the pipes 460-7 may extend any length into an interior of the container. In the example embodiment shown in FIG. 4F, the pipes 460-7 may have circular cross-sectional shapes and may extend different respective distances into the interior of the container.

Based at least in part on the shapes, lengths, and/or characteristics of the pipes, a particular or unique sound may be encoded by the pipes 460-7. In the example embodiment shown in FIG. 4F, a user may be instructed to compress or squeeze the container prior to opening, or an opening motion may result in compression or squeezing of the container. Responsive to compression or squeezing of the flexible container, air may be forced to pass through the pipes 460-7, and a unique sound or sequence of sounds may be emitted based at least in part on the shapes, lengths, and/or characteristics of the pipes.

The pipes, tubes, or whistles 460 as described herein at least with respect to FIGS. 4A-4F may be formed of various materials, such as plastics, metals, composites, or combinations thereof. Further, although the example embodiments described herein refer to one or more pipes on a surface, any numbers, combinations, or arrangements of pipes of different materials on the same or different surfaces of containers are also possible to encode sounds in association with containers. For example, pipes of different materials may be included on the same surface of a container, and/or pipes of the same or different materials may be included on multiple surfaces of a container.

Moreover, as described herein, a combination of two or more portions of pipes on surfaces of a container that simultaneously move relative to each other during opening may enable different processing techniques to recognize the unique sound. For example, a first portion having one or more pipes may encode a reference sound, or reference audio signature, and a second portion having one or more pipes may encode a unique sound, or unique audio signature. Then, when processing the sounds received from the plurality of portions of pipes, the reference sound associated with the first portion may be identified and modified to have a known regular spacing associated with the reference sound, and the unique sound associated with the second portion may then be identified from the sounds or sequence of sounds that have been modified based on the reference sound.

These processing techniques, as well as dynamic time warping and other techniques described herein, may allow the identification of unique sounds even if the rates of opening are different, e.g., faster or slower than an expected or normal rate, and also even if the rates of opening are inconsistent or variable, e.g., a portion of the opening was faster or slower than another portion of the opening, there were one or more pauses during the opening, or other inconsistencies during opening.

Although FIGS. 4A-4F describe particular example embodiments, various aspects of the example embodiments may be combined in various manners to encode sounds in association with containers or compartment of containers. For example, the combinations of types, shapes, lengths, and/or spacings of pipes and/or occluding members are not limited to the particular example embodiments shown.

Sounds that are encoded using any of the example embodiments described herein may include various characteristics. For example, the encoded sounds may be characterized based on frequency (pitch) or wavelength, amplitude or loudness, duration, and/or timbre or tone. The encoded sounds of the example embodiments described herein may be differentiated based at least in part on these characteristics.

Frequency generally refers to a pitch, e.g., highness or lowness, of a sound and relates to the number of cycles per second associated with a sound wave. The encoded sounds described herein may be emitted at any frequency, including both human-audible frequencies and human-inaudible frequencies. Amplitude generally refers to a volume, e.g., loudness or softness, of a sound and relates to the displacement associated with a sound wave. Duration generally refers to a length of time associated with a sound wave.

Timbre or tone generally refers to a quality of a sound as distinguished from a frequency or amplitude of the sound and relates to the harmonic content of a sound wave. For example, a sound emitted by a piano at a particular frequency and amplitude may have a timbre that is different from a sound emitted by a trumpet at the same particular frequency and amplitude, which may have a timbre that is further different from a sound emitted by a saxophone at the same particular frequency and amplitude.

Referring to the example embodiments to encode sounds in association with containers described herein, various aspects of the cords, strings, zippers, tapes, perforations, air pockets, adhesives, interfacing materials, and pipes may produce sounds with different frequencies, amplitudes, durations, and timbres. For example, the materials of the cords, strings, zippers, and tapes may affect various aspects of the encoded sounds, e.g., frequencies and/or timbres. In addition, the materials, shapes, and/or spacings of the perforations, air pockets, and adhesives may affect various aspects of the encoded sounds, e.g., frequencies, amplitudes, durations, and/or timbres. Further, the types, shapes, lengths, and/or spacings of the interfacing materials may affect various aspects of the encoded sounds, e.g., frequencies, amplitudes, durations, and/or timbres. Moreover, the materials, shapes, lengths, and/or spacings of the pipes may affect various aspects of the encoded sounds, e.g., frequencies, durations, and/or timbres.

Referring, for example, to the example embodiments of FIGS. 2A-2E, a perforation having a first shape may encode a sound different from a perforation having a second shape. In addition, a cord or string made of a first material may encode a sound different from a cord or string made of a second material. Referring, for example, to the example embodiments of FIGS. 2F-2G, an air pocket having a first shape or size may encode a sound different from an air pocket having a second shape or size. In addition, a cord or string made of a first material may encode a sound different from a cord or string made of a second material. Referring, for example, to the example embodiments of FIG. 2H, an air pocket having a first shape or size may encode a sound different from an air pocket having a second shape or size. In addition, a zipper made of a first material may encode a sound different from a zipper made of a second material. Referring, for example, to the example embodiments of FIGS. 2I-2J, an adhesive section having a first shape or size may encode a sound different from an adhesive section having a second shape or size. In addition, a tape or adhesive made of a first material may encode a sound different from a tape or adhesive made of a second material. Other aspects related to FIGS. 2A-2J described herein may also result in different encoded sounds.

Referring, for example, to the example embodiments of FIGS. 3A-3E, a material of a first type may encode a sound different from a material of a second type. In addition, a material of a first type interfacing with a second material may encode a sound different from the material of the first type interfacing with a third material. Referring, for example, to the example embodiments of FIGS. 4A-4F, a pipe having a first length may encode a sound different from a pipe having a second length. In addition, a pipe made of a first material may encode a sound different from a pipe made of a second material. Other aspects related to FIGS. 3A-4F described herein may also result in different encoded sounds.

Further, various aspects related to opening the containers described herein may also affect various aspects of the encoded sounds. For example, rates or speeds of pulling or moving cords, strings, zippers, and tapes, rates or speeds of opening covers, doors, endcaps, or flaps having interfacing materials, and/or rates or speeds of opening covers, doors, endcaps, flaps, or other surfaces having pipes may affect amplitudes and/or durations.

Referring to example embodiments described herein related to sequences of sounds, e.g., pluralities of perforations, air pockets, adhesive sections, interfacing materials, or pipes having associated spacings, that are emitted responsive to opening of containers, such sequences of sounds may comprise additional characteristics that may differentiate encoded sounds from each other. For example, the spacing or timing of the sequences of sounds may further differentiate one encoded sound associated with a container from another encoded sound associated with the same or a different container.

The encoded sounds associated with containers as described herein may be processed by various methods to determine audio signatures associated with the encoded sounds. For example, the processing methods may include dynamic time warping, compressing or expanding portions of the encoded sounds, removing portions of the encoded sounds, amplifying portions of the encoded sounds, filtering portions of the encoded sounds, identifying a reference sound associated with the encoded sounds, and/or reference time shifting portions of the encoded sounds, e.g., based on the identified reference sound, or reference audio signature.

Dynamic time warping generally refers to determining a degree of similarity between two sequences in time. For example, each of the two sequences may have different speeds and/or may have inconsistencies or variations in speed. One or more portions of a sequence may be modified or altered non-linearly in time to determine a degree of similarity with another sequence. In the context of the example embodiments described herein, a sequence of sounds may be received and processed by dynamic time warping, e.g., non-linearly modifying one or more portions of the sequence of sounds in time, to determine a degree of similarity between the sequence of sounds and one or more known sequences of sounds. For example, the received sequence of sounds may be processed using dynamic time warping to generate an audio signature, and the generated audio signature may be compared with one or more known audio signatures to determine a degree of similarity.

Alternatively or in addition to dynamic time warping, other processing methods may also be used to identify a received sound or sequence of sounds during opening of a container. For example, portions of the received sound or sequence of sounds may be compressed or expanded in time, e.g., to match an expected duration of the sound or a portion of the sequence of sounds. In addition, portions of the received sound or sequence of sounds may be removed, e.g., to remove pauses or gaps in the sound or sequence of sounds received during opening. Further, portions of the received sound or sequence of sounds may be amplified or filtered, e.g., to remove background noise or sounds.

In further embodiments, alternatively or in addition to dynamic time warping and other processing methods described herein, a reference sound associated with the received sound or sequence of sounds may be identified, and one or more portions of the received sound or sequence of sounds may be reference time shifted based at least in part on the identified reference sound, or reference audio signature.

As part of reference time shifting a received sound or sequence of sounds, referring to example embodiments described herein in which sounds are encoded in two or more portions with a first portion encoding a reference sound and a second portion encoding a unique sound, the reference sound, e.g., a reference audio signature, may be identified as associated with a container. For example, in some embodiments, it may be known that a container sent by a particular user or delivered to a particular user includes a known reference audio signature. In other embodiments, all containers may include the same known reference audio signature. Based on the identified reference audio signature, the received sound or sequence of sounds may be modified such that a reference sound encoded therein matches the identified reference audio signature. Various of the processing methods described herein may be used to match the received reference sound with the identified reference audio signature. Then, the matched reference sound may be removed or filtered from the received sound or sequence of sounds, and the unique sound encoded therein may be identified. Then, the identified unique sound may be compared with one or more known unique audio signatures to determine a closest match with one of the known unique audio signatures.

Furthermore, for any of the example embodiments described herein, there may be a set of unique audio signatures and corresponding embodiments. For example, when a container is to be sent or delivered having an associated encoded sound, one of the set of unique audio signatures may be selected at random. Alternatively, one of the set of unique audio signatures may be selected based on various factors, such as the originator or sender, the origin, the recipient, the destination, contents, other containers previously sent or en route from the same originator or origin, other containers previously sent or en route to the same recipient or destination, or any other factors. Thus, for example, if a first container having a first sound encoded therein is already en route to a destination, a second container to be delivered to the same destination may be encoded with a second, different sound, in order to facilitate differentiation of the first and second containers at the destination.

Moreover, for example embodiments described herein having a plurality of compartments within a container in which each of the compartments includes an associated encoded sound, unique audio signatures and corresponding embodiments for the plurality of compartments may be selected such that no two compartments within the container includes the same encoded sound, in order to facilitate differentiation of each of the compartments.

Furthermore, the description herein related to unique sounds or unique audio signatures is not intended to require that each audio signature be unique with respect to every other possible audio signature. On the contrary, unique sounds or unique audio signatures are intended to refer sounds or audio signatures that may allow identification of a container, compartment, or its contents with respect to other containers, compartments, or their contents. For example, two containers provided to a first location may include two different audio signatures in order to facilitate disambiguation between the two containers at the first location, whereas two other containers provided to a second location may include the same two different audio signatures in order to facilitate disambiguation between the two other containers at the second location; however, the same set of audio signatures may be used for different containers provided to different locations. Accordingly, each of the unique sounds or unique audio signatures need not be globally unique, but may be selectively formed and/or used to facilitate disambiguation between a plurality of containers and their contents.

Figure 5:
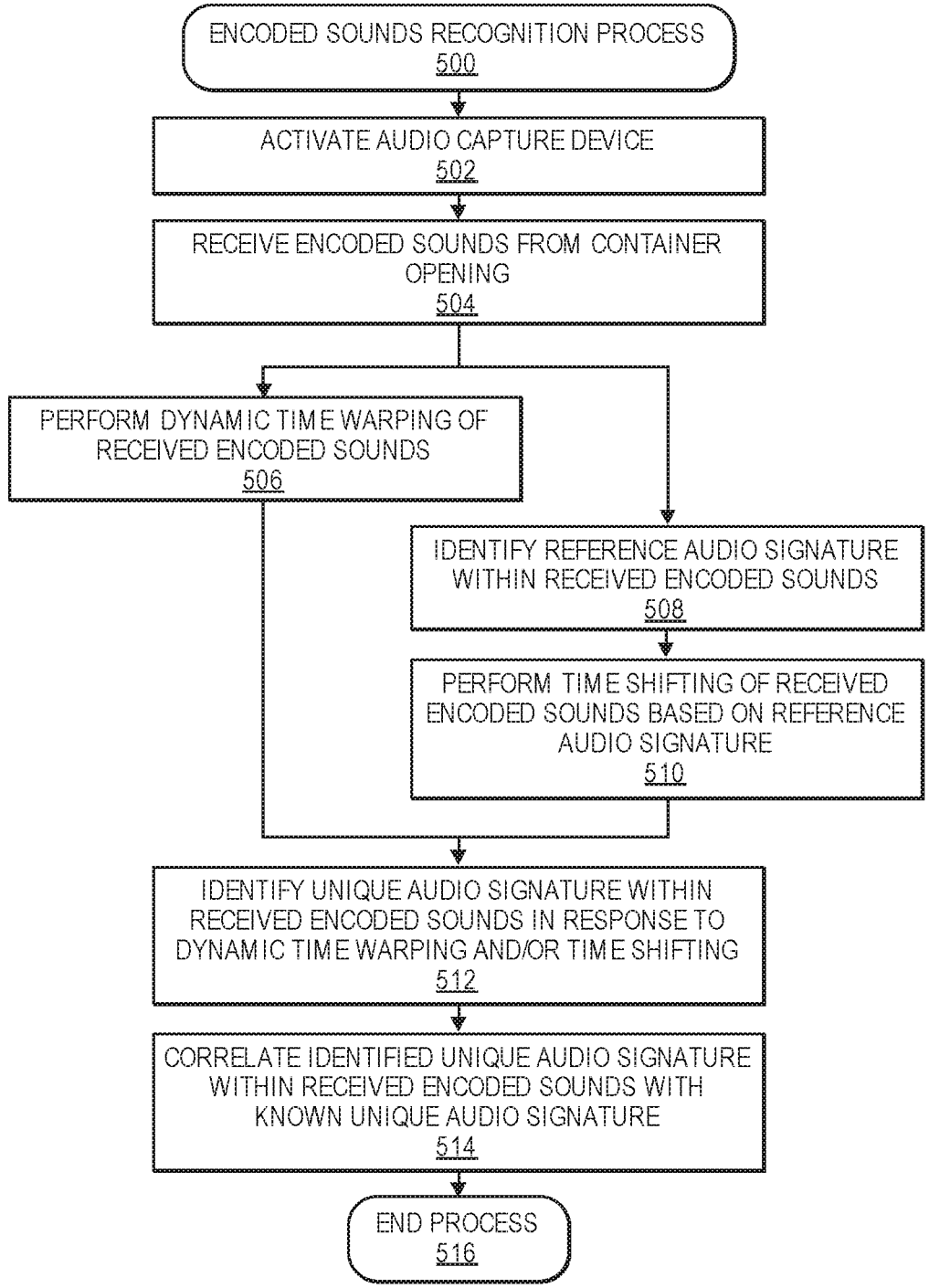
FIG. 5 is a flow diagram illustrating an example encoded sounds recognition process, according to an implementation.

FIG. 5 is a flow diagram illustrating an example encoded sounds recognition process 500, according to an implementation.

The process 500 may begin by activating an audio capture device, as at 502. For example, the audio capture device may be activated based on a manual input, such as a press of a button or selection of an option, either on the device itself or within a software application associated with the device. In addition, the audio capture device may be activated based on a user setting or preference, such as a user option to allow the audio capture device to receive encoded sounds during a delivery window for a container or other limited time window, or a user option to allow the audio capture device to continuously listen for encoded sounds. Further, the audio capture device may be activated based on a voice input, such as a wake-up or initiation statement such as "What's inside this package?" or "Let's open this container." Other methods to activate an audio capture device via manual or voice input are also possible.

The process 500 may continue by receiving, by the audio capture device, encoded sounds from the opening of the container, as at 504. The encoded sounds may be a single sound, multiple sounds, or a sequence of sounds encoded by any of the example embodiments described herein. The encoded sounds may have a constant speed, variable or inconsistent speed, starts and stops, or any other variations related to characteristics of the encoded sounds and/or opening of the container.

The process 500 may then proceed by processing the received encoded sounds by any of the various methods described herein. For example, as described herein, the received encoded sounds may be processed by dynamic time warping, as at 506. Alternatively or in addition, the received encoded sounds may be processed by identifying a reference audio signature within the received encoded sounds, as at 508. For example, a reference audio signature may be known to be associated with the container. Then, the process 500 may proceed to perform reference time shifting of the received encoded sounds based on the reference audio signature, as at 510. For example, as described herein, the received encoded sounds may be modified to match the received reference sound with the known reference audio signature. Further, one or more portions of the received encoded sounds may be compressed, expanded, removed, amplified, filtered, or otherwise processed.

Following processing of the received encoded sounds using any of the various methods described herein, the process 500 may continue by identifying a unique audio signature within the received encoded sounds, as at 512. For example, the received encoded sounds may be further amplified, filtered, or otherwise processed to isolate and identify the unique audio signature, e.g., from a reference audio signature and/or background noise.

Then, the process 500 may proceed to correlate the identified unique audio signature within the received encoded sounds with a known unique audio signature, as at 514. For example, the identified unique audio signature may be compared to a plurality of known unique audio signatures, and one known unique audio signature having the best match or highest similarity with the identified unique audio signature may be determined. The process 500 may then end, as at 516.

Figure 6:
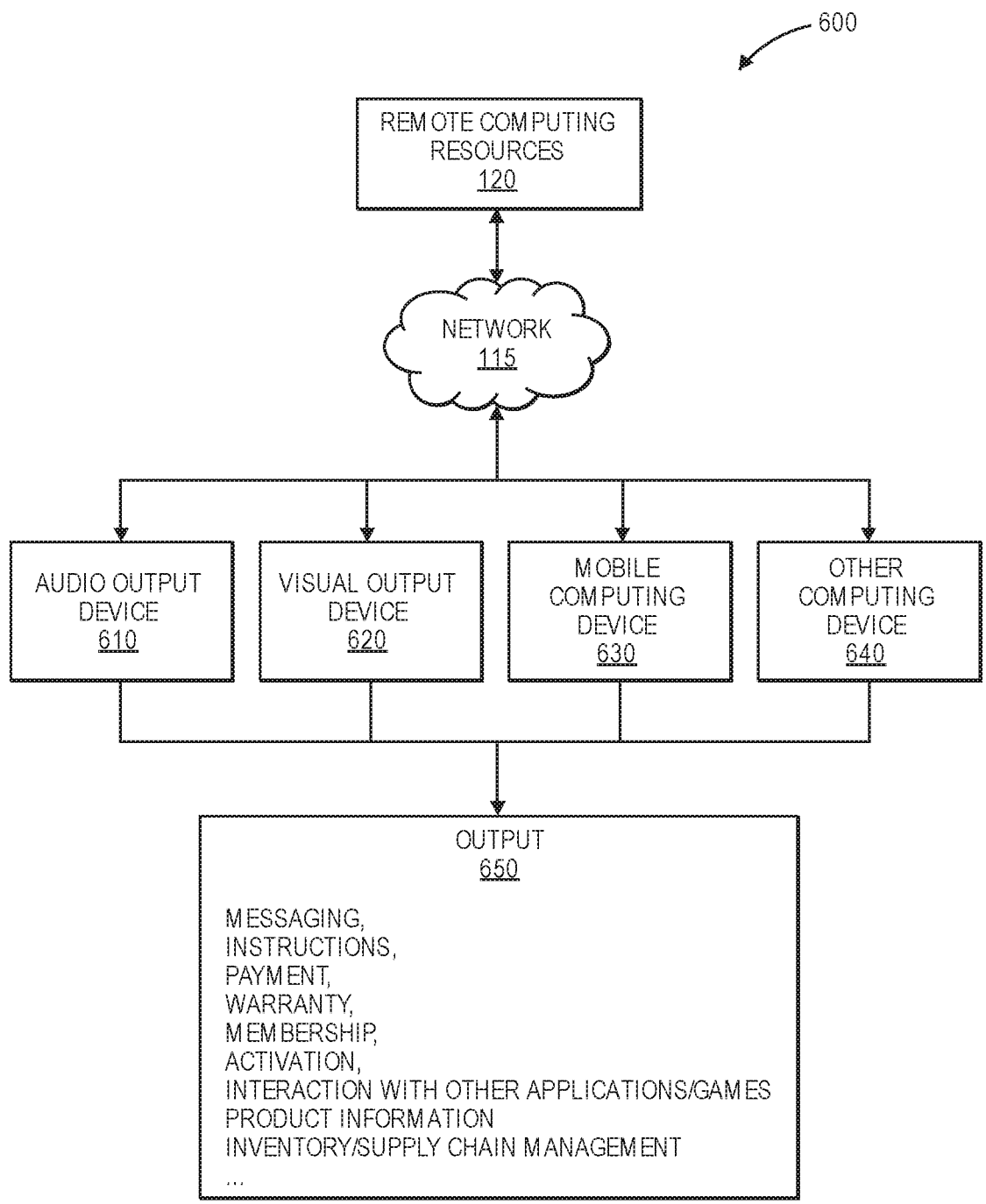
FIG. 6 is a schematic diagram of example embodiments of a system to trigger actions based on encoded sounds associated with containers, according to an implementation.

FIG. 6 is a schematic diagram of example embodiments of a system 600 to trigger actions based on encoded sounds associated with containers, according to an implementation.

As described herein with respect to FIG. 1, the system 600 may include remote computing resources 120 in communication with one or more of an audio output device 610, a visual output device 620, a mobile computing device 630, and/or any other computing device 640 via a network 115. In some example embodiments, one or more of the devices 610, 620, 630, 640 may have the same or similar structure, and/or include the same or similar functionality, as the audio capture devices 110 described with respect to FIG. 1.

In other embodiments, the one or more devices 610, 620, 630, 640 may comprise various other types of output devices. For example, one or more of the devices 610, 620, 630, 640 may be comprised in a robotic device, a mechatronic device, a toy, or other device that may receive encoded sounds via one or more microphones and may output one or more gestures, movements, or actions responsive to the encoded sounds. In one example embodiment, a mechatronic toy in the shape of an animal, character, person, or other animatable object may include one or more movable portions, e.g., arms, hands, legs, facial features, or other portions, that may output one or more gestures responsive to the encoded sounds, such as raising arms, clapping hands, jumping, changing facial expressions, or any other gestures, movements, or actions. Further, the one or more devices 610, 620, 630, 640 may comprise various combinations of output devices, such that the outputs may include gestures, movements, actions, visually displayed outputs, audio outputs, or various combinations thereof responsive to encoded sounds.

After encoded sounds associated with a container are received, processed, and recognized by the remote computing resources 120, the remote computing resources 120 may initiate or trigger one or more actions or outputs 650 based at least in part on the identified unique audio signature associated with a container. For example, each of the known unique audio signatures may be stored in memory, e.g., in communication with or as part of the remote computing resources 120, in association with information associated with a container. The information associated with the container may include information related to the audio signatures, the container itself, contents, an originator or sender, an origin, a recipient, a destination, one or more actions or outputs, or other information.

Based at least in part on the one or more actions or outputs stored in association with the identified audio signatures associated with the container, the remote computing resources 120 may establish or utilize a communication connection with one or more of the devices 610, 620, 630, 640 to initiate or trigger one or more actions or outputs 650. For example, the actions or outputs 650 may include providing messages, e.g., audio and/or video messages, customized or stock messages or advertisements, live or recorded messages, or other types of messages. In addition, the actions or outputs 650 may include providing instructions, directions, guidance, or information related to the container or contents of the container, e.g., product information, assembly instructions, operating instructions, supplementary information, product recall information, messages, notifications, advertisements, or software, instructions related to items to be used in combination with remote guided experiences, or other instructions or information.

A remote guided experience may be a user experience that is curated or facilitated by a guide at a remote location or destination. A user may connect to a remote guided experience using a computing device local to the user, and a guide may utilize a guide device while at the remote location to provide video and/or audio data to the user via a network as part of the remote guided experience. Further, as part of the remote guided experience, a user may receive a container, which container may include a plurality of compartments, that includes one or more objects, items, or products related to the remote guided experience. The one or more objects may include local items, item samples, consumable items, perishable items, novelty items, images, documents, pamphlets, smells, liquids, other types of matter, or any other items related to the remote guided experience.

Utilizing at least some of the example embodiments described herein, the one or more objects may be provided in a plurality of compartments of a container having associated encoded sounds, such that opening of each of the compartments may be recognized based on encoded sounds received by the computing device during a remote guided experience, and instructions and/or information related to the items may be provided to the user. Further, if a user is not currently viewing a remote guided experience, the user may be instructed to initiate or resume the remote guided experience before opening one or more compartments containing objects related to the remote guided experience. Moreover, if a user opens a compartment associated with a different portion of the remote guided experience than that currently being viewed, the user may be instructed to instead open a different compartment that is related to a currently viewed portion of the remote guided experience. In this manner, it may be determined whether a user has opened the various compartments in a particular sequence that corresponds to the remote guided experience.

Referring again to FIG. 6, the actions or outputs 650 may also include performing tasks or actions related to acquisition or purchase of items, e.g., completing payment for an item, activating a warranty for the item, initiating a membership related to the item, initiating a time window to return the item, beginning an introductory time window to use the item, or other tasks or actions.

In addition, the actions or outputs 650 may include initiating interactions with other software applications or games operating on a mobile computing device or other computing device, e.g., providing an entitlement or digital right related to software applications, providing an instruction related to software applications, providing an enhancement, update, or additional functionality associated with software applications, recognizing an advancement associated with software applications or games, initiating particular actions associated with software applications or games, or other interactions with software applications or games.

Further, the actions or outputs 650 may also include performing tasks or actions related to inventory or supply chain management, e.g., confirming receipt of an item, updating an inventory level for the item, approving a payment for the item, tracking movements or tasks related to the item, initiating or instructing movements or tasks related to the item, or other tasks or actions. In addition, sequences of opening containers may be recognized based on the encoded sounds associated with the containers, and instructions, notifications, or guidance may be provided based on the detected sequences, e.g., if certain tasks require particular sequences of operations. Moreover, the tasks or actions related to inventory or supply chain management may be performed in the context of retail environments, wholesale environments, warehouse environments, distribution environments, sortation environments, or any other environments.

Figure 7:
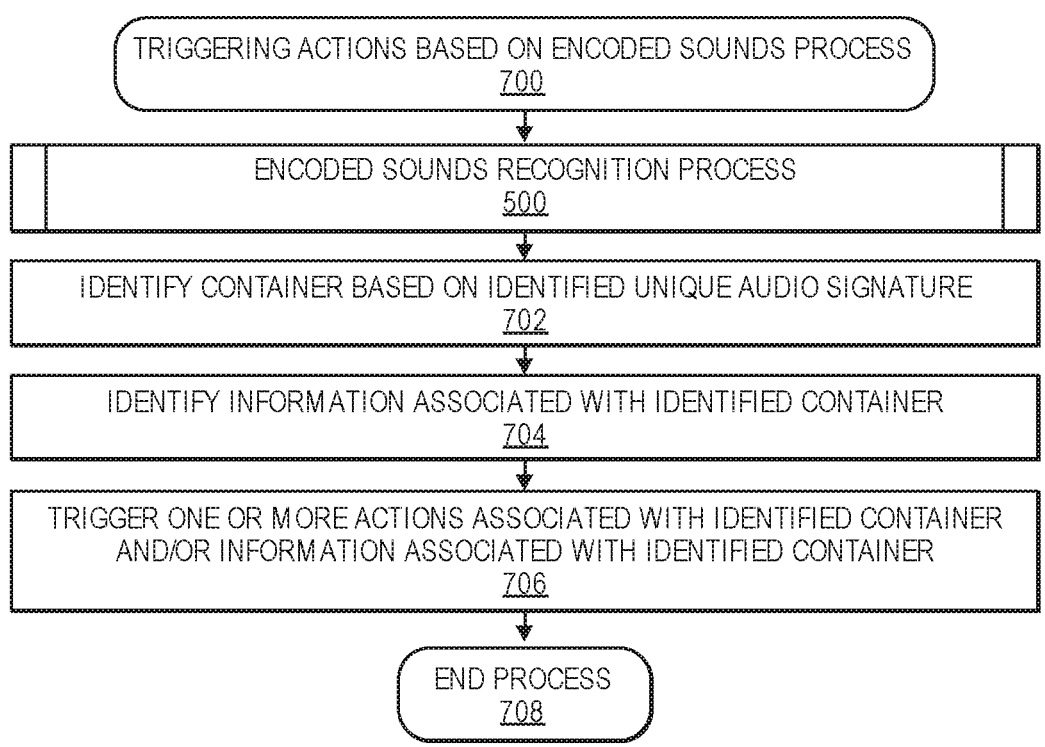
FIG. 7 is a flow diagram illustrating an example triggering actions based on encoded sounds process, according to an implementation.

FIG. 7 is a flow diagram illustrating an example triggering actions based on encoded sounds process 700, according to an implementation.

The process 700 may begin by performing the encoded sounds recognition process, as at 500, as further described herein with respect to FIG. 5. Based at least in part on the identified unique audio signature, the container may be identified, as at 702. For example, associations between containers and unique audio signatures may be stored in memory, e.g., in communication with or as part of the remote computing resources 120. In addition, the unique audio signatures may include a plurality of unique audio signatures associated with respective individual compartments of containers. Further, associations between containers or compartments of containers and reference audio signatures may also be stored in memory.

The process 700 may continue by identifying information associated with the container, as at 704. For example, as described herein, the information associated with the container may include information related to the audio signatures, the container itself, contents, an originator or sender, an origin, a recipient, a destination, one or more actions or outputs, or other information. The process 700 may then trigger one or more actions or outputs associated with the identified container and/or information associated with the identified container, as at 706. For example, as described herein, the actions or outputs may be provided via one or more output devices. In addition, the actions and outputs may include messages, information, instructions, tasks related to acquisition of items, tasks related to other software applications, tasks related to inventory or supply chain management, or any other actions or outputs. The process 700 may then end, as at 708.

FIG. 8 is a block diagram illustrating various components of the remote computing resources 120, according to an implementation. In various examples, the block diagram may be illustrative of one or more aspects of the remote computing resources 120 that may be used to implement the various systems and processes discussed above. In the illustrated implementation, the remote computing resources 120 includes one or more processors 810A-810N, coupled to a non-transitory computer readable storage medium or memory 820 via an input/output (I/O) interface 830. The remote computing resources 120 may also include an audio processing/recognition module 832, a network interface 840, and one or more input/output devices 850.

In various implementations, the remote computing resources 120 may be a uniprocessor system including one processor 810, or a multiprocessor system including several processors 810A-810N (e.g., two, four, eight, or another suitable number). The processor(s) 810 may be any suitable processor capable of executing instructions. For example, in various implementations, the processor(s) 810 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 810 may commonly, but not necessarily, implement the same ISA.

The non-transitory computer readable storage medium 820 may be configured to store executable instructions 822, data 824, and information related to audio signatures, containers, compartments, contents, originators, origins, recipients, destinations, actions, outputs, associations therebetween, and/or other data items 826 accessible by the processor(s) 810. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and information related to audio signatures, containers, compartments, contents, originators, origins, recipients, destinations, actions, outputs, associations therebetween, and/or other data items 826, respectively. In other implementations, program instructions, data and/or other information may be received, sent or stored upon different types of computer-accessible media, such as non-transitory media, or on similar media separate from the non-transitory computer readable storage medium 820 or the remote computing resources 120.

Generally speaking, a non-transitory, computer readable storage medium may include storage media or memory media such as magnetic or optical media, e.g., disk or CD/DVD-ROM, coupled to the remote computing resources 120 via the I/O interface 830. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 840.

In one implementation, the I/O interface 830 may be configured to coordinate I/O traffic between the processor(s) 810, the non-transitory computer readable storage medium 820, and any peripheral devices, the network interface 840, or other peripheral interfaces, such as input/output devices 850. In some implementations, the I/O interface 830 may perform any necessary protocol, timing or other data transformations to convert data signals from one component (e.g., non-transitory computer readable storage medium 820) into a format suitable for use by another component (e.g., processor(s) 810). In some implementations, the I/O interface 830 may include support for devices attached through various types of peripheral buses, such as a variant of the Peripheral Component Interconnect (PCI) bus standard or the Universal Serial Bus (USB) standard, for example. In some implementations, the function of the I/O interface 830 may be split into two or more separate components, such as a north bridge and a south bridge, for example. Also, in some implementations, some or all of the functionality of the I/O interface 830, such as an interface to the non-transitory computer readable storage medium 820, may be incorporated directly into the processor(s) 810.

The audio processing/recognition module 832 may perform any of the various methods described herein to process and recognize received encoded sounds. For example, the various methods may include dynamic time warping, reference time shifting, compressing or expanding portions of the received sounds, removing portions of the received sounds, amplifying portions of the received sounds, filtering portions of the received sounds, or any other processing methods that may be used to identify audio signatures, e.g., reference audio signatures and unique audio signatures, included within the received encoded sounds. The audio processing/recognition module 832 may also perform comparison or matching between identified audio signatures and known audio signatures, e.g., known reference audio signatures or known unique audio signatures stored in memory in association with containers or compartments of containers and related information.

The network interface 840 may be configured to allow data to be exchanged between the remote computing resources 120, other devices attached to a network, such as audio capture devices, audio output devices, visual output devices, mobile computing devices, and/or other computer devices or systems. For example, the network interface 840 may enable wireless communication between numerous remote computing resources 120. In various implementations, the network interface 840 may support communication via wireless general data networks, such as a Wi-Fi network or the Internet. For example, the network interface 840 may support communication via telecommunications networks such as cellular communication networks, satellite networks, and the like.

Input/output devices 850 may, in some implementations, include one or more audio capture devices, audio output devices, visual output devices, mobile computing devices, and/or other computer devices or systems, etc. Multiple input/output devices 850 may be present and controlled or instructed by the remote computing resources 120.

As shown in FIG. 8, the memory may include program instructions 822 which may be configured to implement the example processes and/or sub-processes described above. The data storage 824 and other information 826 may include various data stores for maintaining data items that may be provided for processing encoded sounds, identifying audio signatures within the processed sounds, recognizing the identified audio signatures as matching known audio signatures, identifying containers based on the identified audio signatures, identifying information associated with the identified containers, and/or triggering one or more actions or outputs related to the identified containers or information associated with the identified containers.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Each process described herein may be implemented by the architectures described herein or by other architectures. The processes are illustrated as a collection of blocks in a logical flow. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process. Additionally, one or more of the operations may be considered optional and/or not utilized with other operations.

Those skilled in the art will appreciate that the remote computing resources 120 are merely illustrative and are not intended to limit the scope of the present disclosure. In particular, the computing system and devices may include any combination of hardware or software that can perform the indicated functions, including computers, network devices, internet appliances, PDAs, wireless phones, pagers, etc. The remote computing resources 120 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated remote computing resources 120. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the remote computing resources 120 may be transmitted to the remote computing resources 120 via transmission media or signals, such as electrical, electromagnetic, or digital signals, conveyed via a communication medium, such as a network and/or a wireless link. Various implementations may further include receiving, sending or storing instructions and/or data implemented in accordance with the foregoing description upon a computer-accessible medium. Accordingly, the techniques described herein may be practiced with other remote computing resource configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A container, comprising:
    an enclosure configured to contain an object, the enclosure comprising a plurality of compartments coupled to each other; and
    at least one component associated with a compartment of the plurality of compartments, the at least one component being configured to be opened and to cause emission of a sound responsive to opening of the at least one component while the compartment is coupled to others of the plurality of compartments of the enclosure;
    wherein the at least one component is formed differently than other components associated with the others of the plurality of compartments, such that the sound that is emitted responsive to opening of the at least one component associated with the compartment is distinct from respective sounds that are emitted responsive to opening of respective other components associated with the others of the plurality of compartments.

2. The container of claim 1, wherein the enclosure further comprises at least one of a rectangular container, a cylindrical container, or a pouch.

3. The container of claim 1, wherein the at least one component comprises at least one of a door, an endcap, a flap, a seam, or a cover.

4. The container of claim 1, wherein the at least one component comprises a cord that extends along a plurality of perforations, the plurality of perforations encoding the sound based at least in part on at least one of a shape or a spacing of the plurality of perforations.

5. The container of claim 1, wherein the at least one component comprises a cord that extends along a plurality of air pockets, the plurality of air pockets encoding the sound based at least in part on at least one of a shape or a spacing of the plurality of air pockets.

6. The container of claim 1, wherein the at least one component comprises a tape that includes a plurality of adhesive sections, the plurality of adhesive sections encoding the sound based at least in part on at least one of a shape or a spacing of the plurality of adhesive sections.

7. The container of claim 1, wherein the at least one component comprises a first material that contacts a portion of the enclosure, the first material encoding the sound based at least in part on a characteristic of the first material.

8. The container of claim 7, wherein the portion of the enclosure comprises a second material that contacts the first material, the second material further encoding the sound based at least in part on a characteristic of the second material.

9. The container of claim 8, wherein at least one of the first material or the second material includes a plurality of material sections, the plurality of material sections further encoding the sound based at least in part on at least one of a shape or a spacing of the plurality of material sections.

10. The container of claim 1, wherein the at least one component comprises at least one pipe through which air passes, the at least one pipe encoding the sound based at least in part on a characteristic of the at least one pipe.

11. The container of claim 10, wherein the at least one pipe comprises a plurality of pipes through which air passes, and the enclosure comprises at least one occluding member, the plurality of pipes further encoding the sound based at least in part on a characteristic of the at least one occluding member.

12. The container of claim 1, wherein the at least one component includes a first component that encodes a reference sound, and a second component that encodes the sound associated with the compartment, wherein the sound includes the reference sound and the sound associated with the compartment.

13. The container of claim 1, wherein the sound is associated with at least one of a human-audible frequency or a human-inaudible frequency.

14. A container, comprising:
    an enclosure configured to contain an object, the enclosure comprising a plurality of compartments that are coupled to each other; and
    a plurality of components configured to open respective compartments of the plurality of compartments, individual ones of the plurality of components being configured to cause emission of respective sounds responsive to opening of the individual ones of the plurality of components while the plurality of compartments are coupled to each other as part of the enclosure;
    wherein the respective sounds are associated with at least one of the enclosure or the object; and
    wherein the individual ones of the plurality of components are formed differently from each other, such that individual ones of the respective sounds that are emitted responsive to opening of the individual ones of the plurality of components are distinct from each other.

15. The container of claim 14, wherein at least one component of the plurality of components comprises at least one of a seam, a cover, a door, an endcap, or a flap.

16. The container of claim 14, wherein at least one component of the plurality of components comprises a cord that extends along a plurality of perforations, the plurality of perforations encoding a respective sound based at least in part on at least one of a shape or a spacing of the plurality of perforations.

17. The container of claim 14, wherein a portion of a surface of at least one component of the plurality of components comprises a first material that contacts a portion of a surface of the enclosure;
- wherein the portion of the surface of the enclosure comprises a second material that contacts the first material of the at least one component;
- wherein the first material and the second material encode a respective sound based at least in part on characteristics of the first material and the second material.

\* \* \* \* \*